US006756535B1

(12) United States Patent
Yoshino et al.

(10) Patent No.: US 6,756,535 B1
(45) **Date of Patent: *Jun. 29, 2004**

(54) ELECTRONIC PERCUSSION INSTRUMENTAL SYSTEM AND PERCUSSION DETECTING APPARATUS THEREIN

(75) Inventors: Kiyoshi Yoshino, Osaka (JP); Kenji Hirano, Osaka (JP); Masato Katsuda, Osaka (JP)

(73) Assignee: Roland Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/845,368

(22) Filed: Apr. 30, 2001

Related U.S. Application Data

(60) Continuation of application No. 09/401,459, filed on Sep. 22, 1999, now Pat. No. 6,271,458, which is a continuation of application No. 09/243,698, filed on Feb. 3, 1999, now Pat. No. 6,121,538, which is a division of application No. 08/886,180, filed on Jul. 1, 1997, now Pat. No. 5,920,026.

(30) Foreign Application Priority Data

| | | |
|---|---|---|
| Jul. 4, 1996 | (JP) | 8-193986 |
| Jan. 13, 1997 | (JP) | 9-15846 |
| Jan. 13, 1997 | (JP) | 9-15847 |

(51) Int. Cl.[7] ........ G01D 13/32
(52) U.S. Cl. ........ 84/738; 84/414
(58) Field of Search ........ 84/414, 416, 452 P, 84/454, 723, 737, 738, 743

(56) References Cited

U.S. PATENT DOCUMENTS

| | | | | |
|---|---|---|---|---|
| 729,936 | A | 6/1903 | Heybeck | 84/414 |
| 3,748,367 | A | 7/1973 | Lamme et al. | |
| 4,226,156 | A | 10/1980 | Hyakutake | 84/1.14 |
| 4,279,188 | A | 7/1981 | Scott | |
| 4,362,081 | A | 12/1982 | Hartry | 84/414 |
| 4,581,973 | A | 4/1986 | Hoshino | |
| 4,714,002 | A | 12/1987 | Cleland | 84/413 |
| 4,798,121 | A | 1/1989 | Donohoe | 84/414 |
| 4,828,907 | A | 5/1989 | Hayashi | |
| 4,947,725 | A | 8/1990 | Nomura | 84/723 |
| 5,042,356 | A | 8/1991 | Karch | 84/725 |
| 5,449,964 | A | 9/1995 | Snyder | 310/330 |
| 5,533,405 | A | 7/1996 | Hoshino | 84/104 |
| 5,585,581 | A | 12/1996 | Rogers | 84/723 X |
| 5,633,473 | A | 5/1997 | Mori et al. | 84/735 X |

FOREIGN PATENT DOCUMENTS

| | | |
|---|---|---|
| DE | 19625570.8-51 | 6/1996 |
| JP | 2-117569 | 9/1990 |

OTHER PUBLICATIONS

Syndrum product sample (delivered to Examiner for review) and thirteen (13) photographs of same.
Deposition of Peter Hart, Roland Corp. vs. Hart Dynamics, Fed. Dist. Ct. for the Central Dist. of CA Mar. 3, 2003.*

* cited by examiner

*Primary Examiner*—Jeffrey Donels
(74) *Attorney, Agent, or Firm*—Foley & Lardner

(57) ABSTRACT

An object of the present invention is to provide a percussion detecting apparatus, which is excellent in percussion feeling, and the percussion sounds of which are very small, in electronic percussion instrumental system. The percussion detecting apparatus is provided with a head prepared from a net-like raw material composed of a first net and a second net, the net-like raw material being obtained by such a manner that both the nets having been woven in accordance with plane weaving manner wherein the longitudinal and transverse fibers cross at right angles are laminated in such a way that the weave pattern directions thereof intersect obliquely with each other; and a head sensor which is in contact with the center position of the under side in the head and detects percussion with respect to the head as electric signal.

33 Claims, 23 Drawing Sheets

ELECTRONIC PERCUSSION INSTRUMENTAL SYSTEM AND PERCUSSION DETECTING APPARATUS THEREIN

This application is a continuation of application Ser. No. 09/401,459, filed Sep. 22, 1999 now U.S. Pat. No. 6,271, 458, which is a Continuation of application Ser. No. 09/243, 698, filed Feb. 3, 1999 (now U.S. Pat. No. 6,121,538), which his a Divisional of Application Ser. No. 08/886,180, filed Jul. 1, 1997 (now U.S. Pat. No. 5,920,026).

BACKGROUND OF THE INVENTION

1. Field of the Invention

The present invention relates to an electronic percussion instrumental system and a percussion detecting apparatus in the electronic percussion instrumental system, and more particularly to an electronic percussion instrumental system which simulates a percussion instrument such as acoustic drum sounding musical tone as a result of percussing it with sticks or the like by a player and a percussion detecting apparatus in the electronic percussion instrumental system.

2. Description of the Related Art

Heretofore, in an electronic percussion instrumental system such as electronic drum simulating acoustic drum, a percussion detecting apparatus provided with a surface to be percussed being generally called by the name of "percussion pad" is utilized as a means for detecting percussion.

As such a percussion detecting means as described above, for example, the percussion detecting apparatus disclosed in Japanese Patent Laid- open No. 44357/1996 has been known. In the percussion detecting apparatus disclosed in Japanese Patent Laid-open No. 44357/1996, the percussion surface is formed by covering a plate-like case with a material of a soft high-molecular compound.

However, in such percussion detecting apparatus wherein the percussion surface is formed by covering the plate-like case with a soft high-molecular compound material, there is such a problem that repulsive feeling at the time of percussing the percussion surface is remarkable, so that good percussion feeling cannot be obtained. In addition, the above described percussion detecting apparatus involves also such a problem that there is a fear of disturbing the performance by the percussion sound, because the percussion sound generated at the time when the percussion surface is percussed is significant.

On one hand, it has been proposed to utilize, as a percussion detecting means, a percussion surface, the tension of which can be adjusted and is called by the name of "head" in acoustic drum, which is further provided with a sensor for detecting percussion.

In the present specification, adjustment for tension of a percussion surface which is adjustable as in the head of acoustic drum will be called by the term "tuning".

In the case when the head of acoustic drum is served for a percussion detecting means as described above, there is such a problem that although percussion feeling is excellent in this case because the head for the acoustic drum is utilized as it is, the percussion sound becomes remarkable so that it disturbs the performance.

OBJECTS AND SUMMARY OF THE INVENTION

The present invention has been made in view of the problems as described above involved in the prior art Accordingly, an object of the present invention is to provide a percussion detecting apparatus provided with a head as the percussion surface which is excellent in percussion feeling and in which the percussion sound is extremely quiet in an electronic percussion instrumental system.

Furthermore, another object of the present invention is to provide an electronic percussion instrumental system which is adapted to be easily capable of correct tuning of the head in the case when the head is tuned on the basis of an indication which is suitably given and corresponding to a position of percussion in the head.

Moreover, still another object of the present invention is to provide an electronic percussion instrumental system which is adapted to be capable of detecting a correct position in percussion by correcting variations in tension of the head as a result of tuning of the same.

An yet further object of the present invention is to provide an electronic percussion instrumental system which is adapted to make clear a position of percussion in the head in case of tuning operation to display the tuning state, whereby the tuning operation can be carried out while confirming the state, so that anybody can easily conduct such tuning operation without requiring any sense of skilled user.

In order to achieve the above described objects, the present invention is characterized by a percussion detecting apparatus in electronic percussion instrumental system comprising a head the percussion surface of which is composed of a net-like raw material; and a percussion detecting means being in contact with the center position of the aforesaid head and detecting percussion with respect to the aforesaid head as electric signal.

Therefore, in accordance with the present invention, since the percussion surface of the head is composed of a net-like raw material, extremely good percussion feeling can be obtained because of the elasticity of the net-like raw material. Besides, since air passes through the openings of stitches in the net-like raw material, percussion sound in case of percussing the head becomes extremely small.

Furthermore, the present invention is characterized by an electronic percussion instrumental system which detects percussion as electric signal and generates musical tone based on the electric signal thus detected comprising a head the percussion surface of which to be percussed is tunable; a percussion detecting means for detecting percussion upon the aforesaid head as electric signal; a means for detecting a position of percussion point for performing arithmetic computations by inputting the electric signal detected by means of the aforesaid percussion detecting means to detect percussion point positional information; and a display means for effecting a display corresponding to the percussion point positional information detected by the aforesaid means for detecting a position of percussion point.

Therefore, in accordance with the present invention, since a display corresponding to the percussion point positional information is effected by means of the display means, the head can be tuned while observing visually the resulting display, so that correct tuning of the head can easily be realized.

Moreover, the present invention is characterized by an electronic percussion instrumental system comprising further an arithmetic computation compensating means for compensating the arithmetic computations in the aforesaid means for detecting the position of percussion point in response to a tuning state of the aforesaid head.

Therefore, in accordance with the present invention, the arithmetic computations for detecting the percussion point positional information in response to tuning of the head are compensated, the position of percussion point is also compensated in response to tuning of the head, whereby it becomes possible to display the correct position of percussion point.

Still further, the present invention is characterized by an electronic percussion instrumental system which detects percussion as electric signal and generates musical tone based on the electric signal thus detected comprising a tunable head; a means for detecting a position of percussion point for detecting the position of percussion point upon the aforesaid head; and a display means for effecting a display in response to the results detected by the aforesaid means for detecting the position of percussion point; a percussion point positional mark for tuning being provided on the aforesaid head.

Therefore, in accordance with the present invention, since a tuning operation can be conducted by a user in accordance with such a manner that a place marked with a percussion point positional mark is percussed by the user, and the result detected at that time by the position of percussion point detecting means is confirmed while watching the display means, tuning operation can simply be carried out without relying upon user's sense.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

An example of manner of practice of the electronic percussion instrumental system and the percussion detecting apparatus in the electronic percussion instrumental system according to the present invention will be described in detail hereinafter in conjunction with the accompanying drawings.

Figure 1:
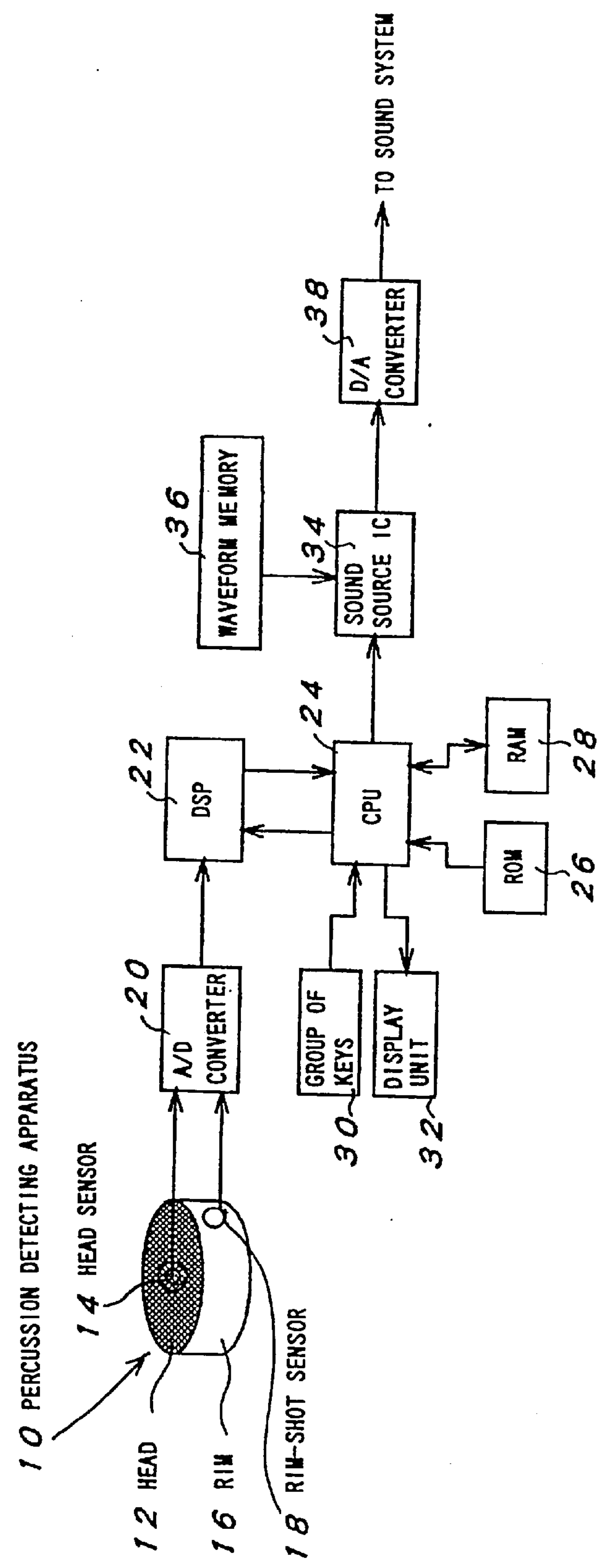
FIG. 1 is a constitutional block diagram showing an example of manner of practice of the electronic percussion instrumental system according to the present invention.

FIG. 1 is a constitutional block diagram showing an example of manner of practice of the electronic percussion instrumental system according to the present invention wherein the electronic percussion instrumental system comprises a percussion detecting apparatus 10 provided with a head sensor 14 functioning as a percussion detecting means for detecting percussion applied to a head 12 the surface of which is composed of a net-like raw material which will be described hereunder, and a rim-shot sensor 18 for detecting percussion applied to a rim 16; an analog-to-digital (A/D) converter 20 which performs analog-to-digital conversion of the detected signals output from the head sensor 14 and the rim-shot sensor 18 in time-sharing manner and inputs the converted signals to a DSP 22 which will be mentioned hereinafter; the DSP 22 which detects the percussion applied to the head 12, the intensity thereof, the position of percussion from the detected signals which are derived from the head sensor 14 and which were input from the analog-to-digital converter 20 as well as performance by means of a brush, and in addition, the DSP detecting also the percussion applied to the rim 16 and the intensity thereof from the detected signals which are derived from the rim-shot sensor 18 and which were input from the analog-to-digital converter 20 to supply the results thus detected to a CPU 24 which will be described hereunder; the CPU 24 which supplies the output from the DSP 22 to a sound source IC 34, which will be undermentioned, wherein the output is converted into required performance information, as well as detects operations of a group of operation keys 30 which will be mentioned hereinafter, and controls the DSP 22; a read only memory (ROM) 26 storing a program or the like which is to be executed by the CPU 24, a random access memory (RAM) 28 functioning as a working area required for executing the program by means of the CPU 24; the group of operation keys 30 including mode selecting keys for setting normal performance mode, brush performance mode or tuning mode, keys for selecting tone color or setting level or the like, and the like keys; a display unit 32 for displaying an operation mode selected by a key in the group of operation keys 30, tone colors required for the tone color selection, and a tuning state in case of tuning mode; the sound source IC 34 which reads a waveform memory 36 which will be undermentioned on the basis of performance information from the CPU 24 to form digital musical tone signals and outputs the signals thus formed to a digital-to-analog (D/A) converter 38 which will be described hereunder; the waveform memory 36 storing sampling waveform data for forming the musical tone signals; and the digital-to-analog converter 38 for converting digital musical tone signals supplied from the sound source IC 34 into analog musical tone signals to output the signals thus converted to a sound system composed of an amplifier, a speaker and the like.

Figure 2:
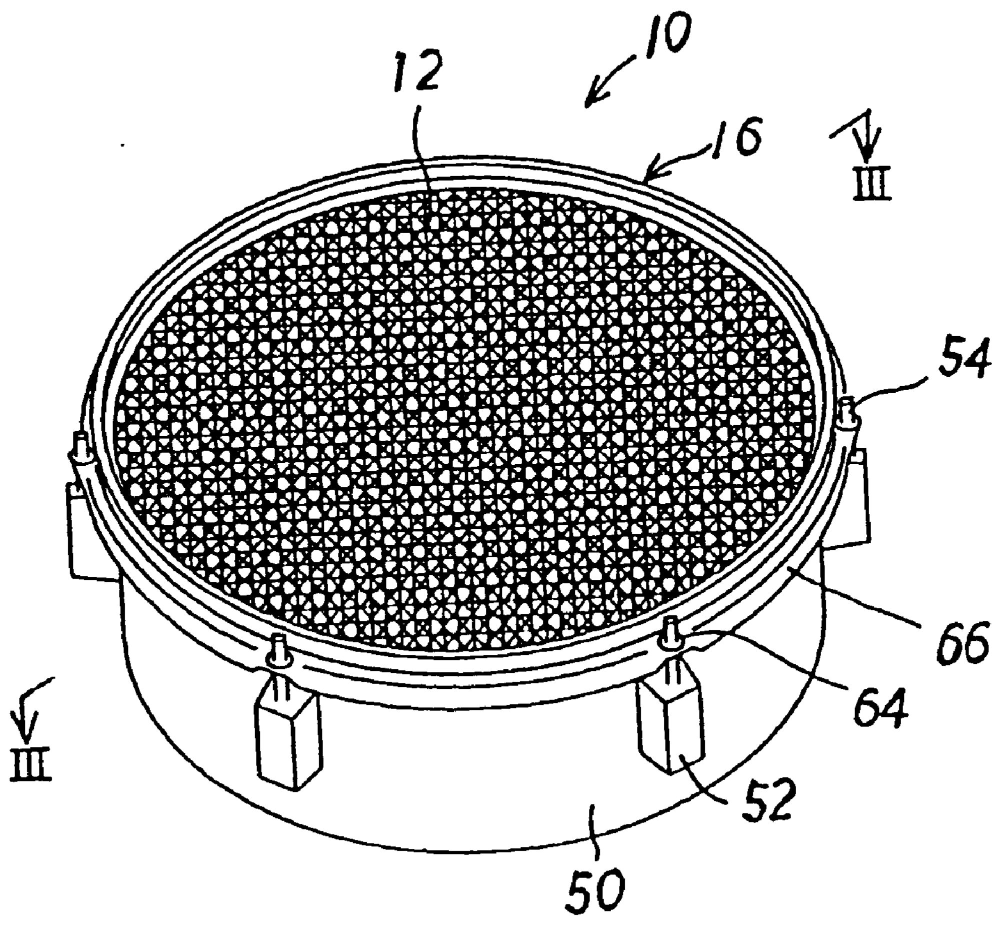
FIG. 2 is a perspective view showing a percussion detecting apparatus.

Then, the constitution of the percussion detecting apparatus 10 will be described by referring to FIG. 2 being a perspective view showing the percussion detecting apparatus 10 and FIG. 3 being a sectional view taken along the line III—III of FIG. 2.

The percussion detecting apparatus 10 contains a cylindrical barrel section 50, and around the outer circumference of the barrel section 50 are formed protrusively engaging portions 52 each having a tapped hole (not shown) provided with a thread groove (not shown) with a prescribed interval along the diametrical direction of the barrel section. Into the engaging portion 52 is screwed an engaging pin 54 on which is formed a thread ridge to be combined with the thread groove formed on the engaging portion 52, so that the head 12 and the rim 16 are fixed to the barrel section 50 through the engaging pin 54. Furthermore, a locking projection **54*a* for locking the rim 16 is a formed on the engaging pin 54**.

Figure 4:
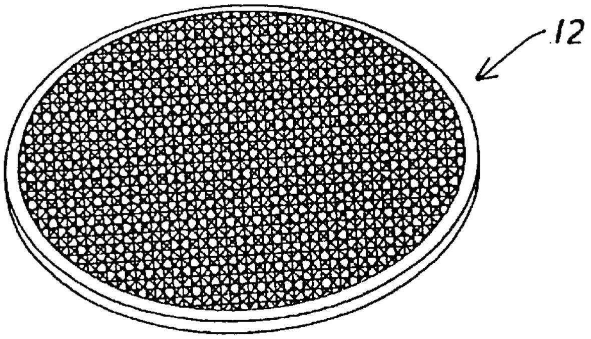
FIG. 4 is a perspective view showing a head.
Figure 5:
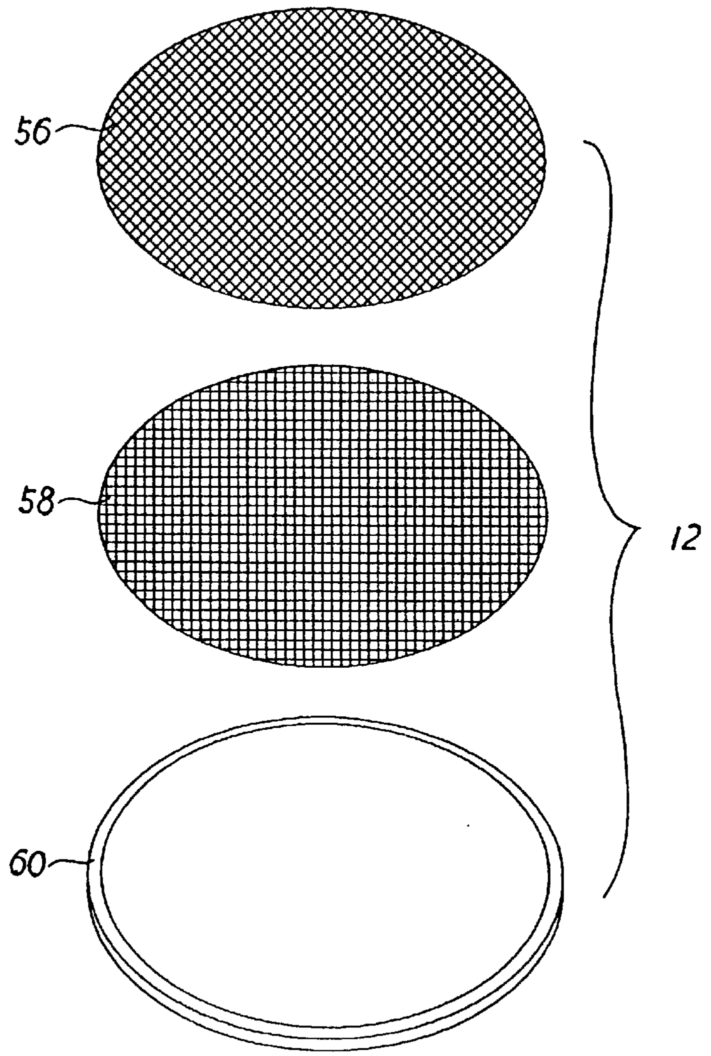
FIG. 5 is a perspectively exploded view of the head.
Figure 6:
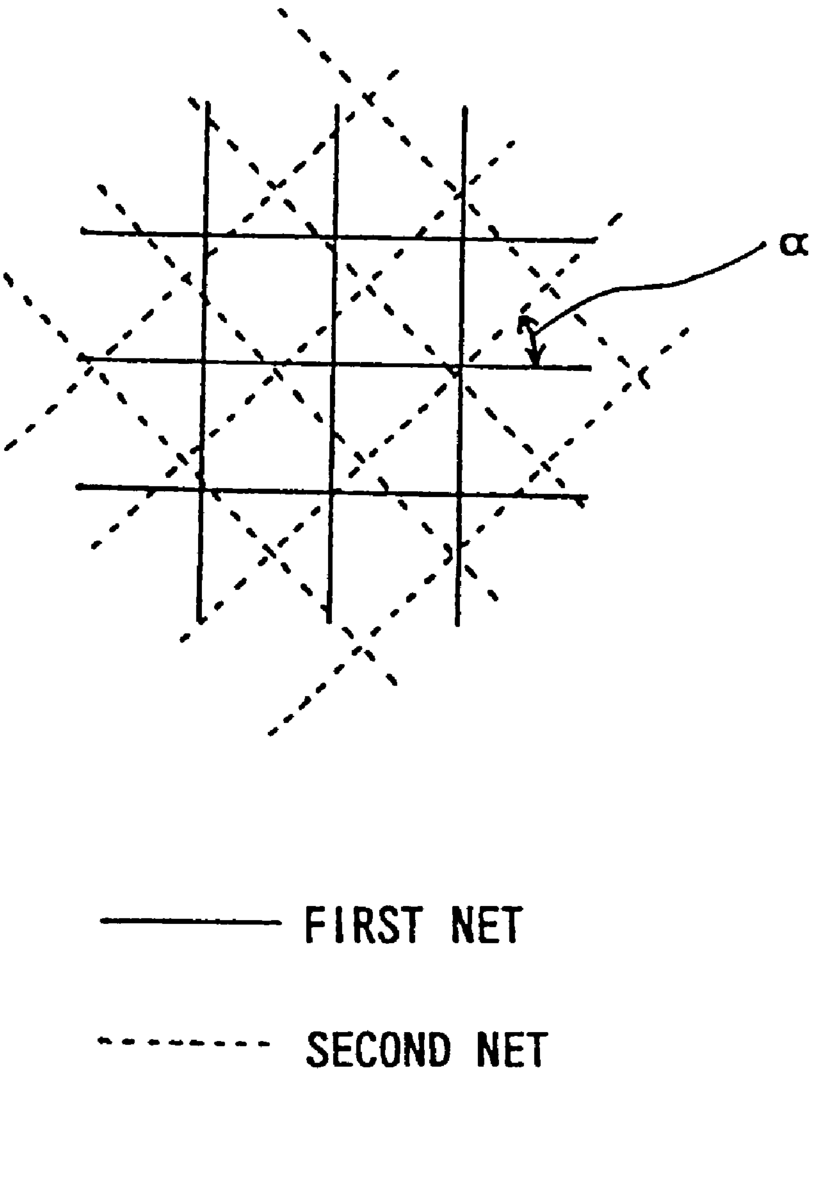
FIG. 6 is an explanatory view showing a case where directions in weave patterns of a first net and a second net intersect obliquely.

The head 12 is prepared as shown in FIGS. 4 and 5 in such a manner that a net-like raw material composed of a first net 56 and a second net 58, each of which is woven in accordance with plane weave wherein the longitudinal and transverse fibers cross at right angles, are laminated to one another so as to cross obliquely their longitudinal and transverse weave pattern directions, and the net-like raw material thus arranged is bonded to a frame 60. It is to be noted herein that the expression "the weave pattern direction of the first net 56 crosses obliquely that of the second net 58" means that when the first net 56 wherein the longitudinal and transverse fibers cross at right angles is superposed on the second net 58 wherein the longitudinal and transverse fibers cross at right angles, adjacent fibers in the first net 56 and the second net 58 thus superposed intersect with each other at an angle α which is smaller than 90 degrees as shown in FIG. 6.

Figure 20:
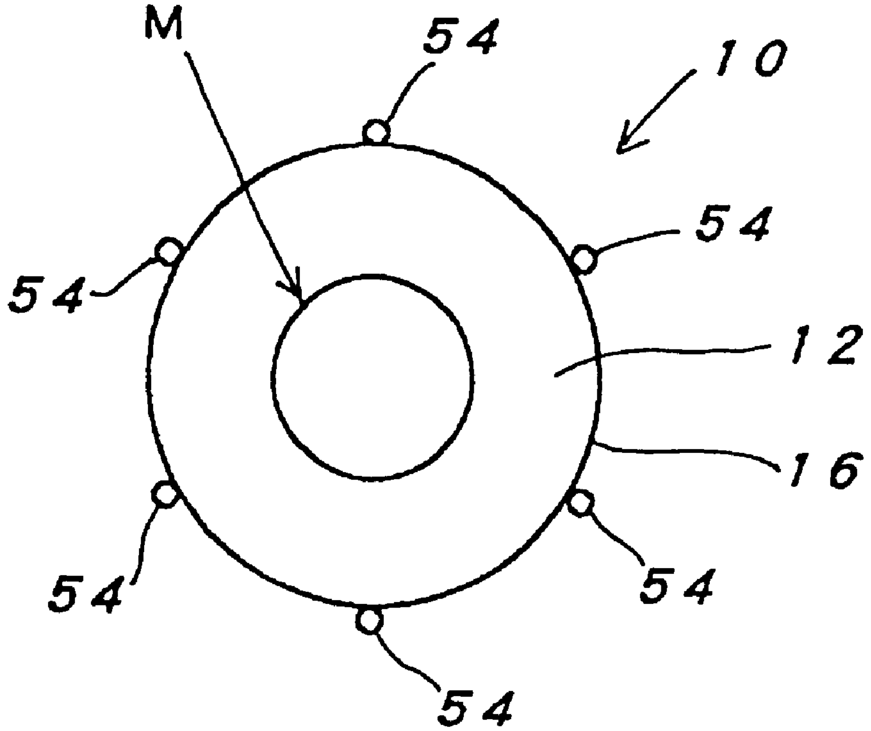
FIG. 20 is a schematic top view of a percussion detecting apparatus showing an example of percussion point positional mark displayed on the top of a head.

Moreover, on the top of the head 12 is provided a percussion point positional mark M which is formed with a circular contour by means of printing as shown in FIG. 20 and which is used in case of tuning operation.

Furthermore, the rim 16 is prepared by integrally molding a metallic material and is composed of a flange portion 66 which is positioned around the outer circumference of the rim and has hole potions 64 into each of which an engaging pin 54 can be inserted, and a rim percussion portion 68 which is ascendingly formed and extended from the flange portion 66 around the inner circumference thereof The top of the rim percussion portion 68 is covered with a covering member 70 made from an elastic material such as rubber, sponge and the like.

A manner for fixing the head 12 and the rim 16 to the barrel section 50 each of them having the structure described above is such that the head 12 is first put on the barrel section 50, then, the rim 16 is put on the head 12, and the positions of them are adjusted in such a way that each hole portion 64 of the rim 16 communicates with each tapped hole defined on each engaging portion 52 of the barrel section 50. Thereafter, each engaging pin 54 is inserted into each hole portion 64 of the rim 16 as well as into each tapped hole defined on each engaging portion 52 of the barrel section 50, and the thread ridge of each engaging pin 54 is threadedly combined with the thread groove in each engaging portion 52 of the barrel section 52, so that the head 12 and the rim 16 are forcedly fixed to the barrel section 50 by means of the locking projection **54*a* of each engaging pin 54**.

Figure 3:
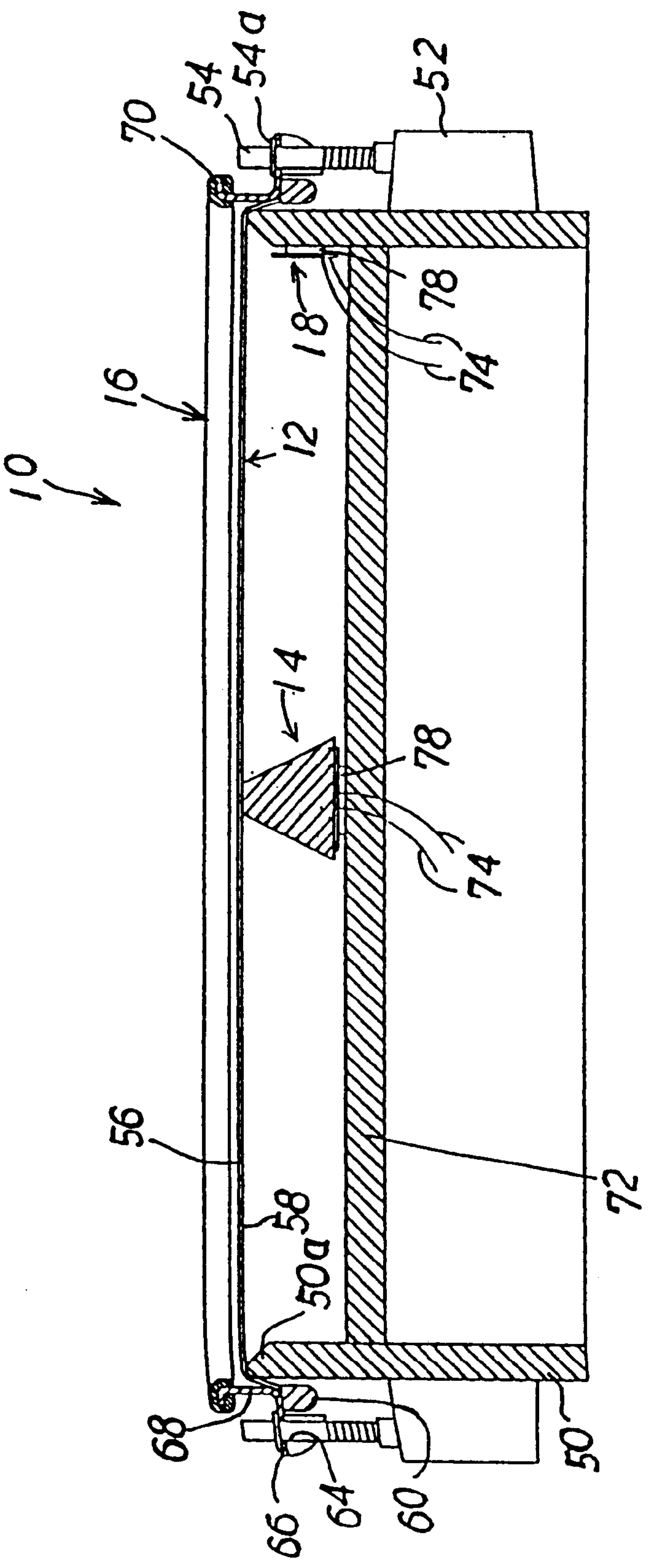
FIG. 3 is a sectional view taken along the line III—III of FIG. 2.

More specifically, with the progress of screwing each engaging pin 54 in the tapped hole in each engaging portion 52 of the barrel section 50, the flange portion 66 of the rim 16 is pressed downwards in FIG. 3 by means of each locking projection 54a, so that the frame 60 of the head 12 is also pressed downwards through the flange portion 66. As a result, the first net 56 and the second net 58 the downward movement of which are restricted by an upper end portion **50*a* of the barrel section 50, respectively, are stretched over the barrel section 50 with a prescribed tension. Thus, when an amount of screwing each engaging pin 54 in each tapped hole defined on each engaging portion 52 of the barrel section 50 is adjusted, the tension of the first net 56 and the second net 58 can be arbitrarily controlled, whereby tuning of the head 12** can be carried out.

Furthermore, a head sensor supporting material 72 is placed in the barrel section 50 in such that the head sensor supporting material 72 intersects the position of the axial center of the barrel section 50. A head sensor 14 is bonded to the top of the head sensor supporting material 72 at the central portion thereof by means of a cushioning double-coated tape 78 which will be described hereinafter so as to be in contact with the second net 58. In other words, the head sensor 14 is disposed on the under surface of the net-like raw material composed of the first net 56 and the second net 58 in the head 12 at the center thereof in contact therewith.

Figure 7:
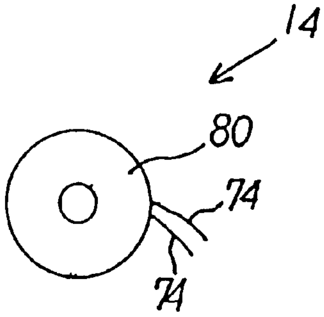
FIGS. 7(*a*), 7(*b*), and 7(*c*) are explanatory views wherein FIG. 7(*a*) is a fragmentary view taken in the direction of the arrow A of FIG. 7(*b*), FIG. 7(*b*) is a front view, and FIG. 7(*c*) is a fragmentary view taken in the direction of the arrow C of FIG. 7(*b*), respectively.
Figure 7:
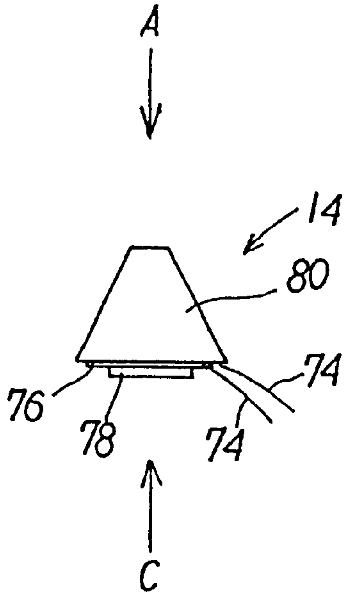
Figure 7:
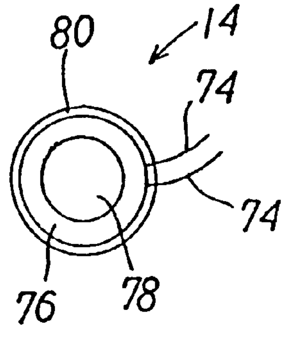

As shown in FIGS. 7(*a*), 7(*b*), and 7(*c*), the head sensor 14 is provided with a disc-shaped piezoelectric element 76 containing wires for output signal 74, and to the under surface of the piezoelectric element 76 is bonded the cushioning double-coated tape 78. A diameter of the cushioning double-coated tape 78 is made to coincide with an node diameter of the piezoelectric element 76.

Furthermore, to the top of the piezoelectric element 76 is bonded a frustoconical cushioning member 80 made from an elastic material such as rubber, sponge and the like. The cushioning member 80 has a bottom surface of a larger in diameter than that of the piezoelectric element 76, the cross section of which tapers off upwardly, and it is in contact with the second net 58 at the extreme end of the cushioning member 80 of a thin diameter.

Moreover, in the vicinity of the rim percussion portion 68 disposed on the upper portion inside the barrel section 50 is bonded the rim-shot sensor 18 by means of the cushioning double-coated tape 78. The rim-shot sensor 18 is provided with the disc-shaped piezoelectric element 76 containing wires for output signal 74, and to the under surface of the piezoelectric element 76 is bonded the cushioning double-coated tape 78. The diameter of the cushioning double-coated tape 78 is made to coincide with the node diameter of the piezoelectric element 76.

Namely, in the electronic percussion instrumental system according to the present invention, a member obtained by removing the cushioning member 80 from the head sensor 14 is used as the rim-shot sensor 18, whereby improvements in efficiency of parts to be used are intended.

In this electronic percussion instrumental system, a variety of heads 12 having different diameters as well as a variety of the barrel sections 50 being adapted for such various heads and the like members are prepared, whereby a size of the head 12 is suitably changed.

Figure 8:
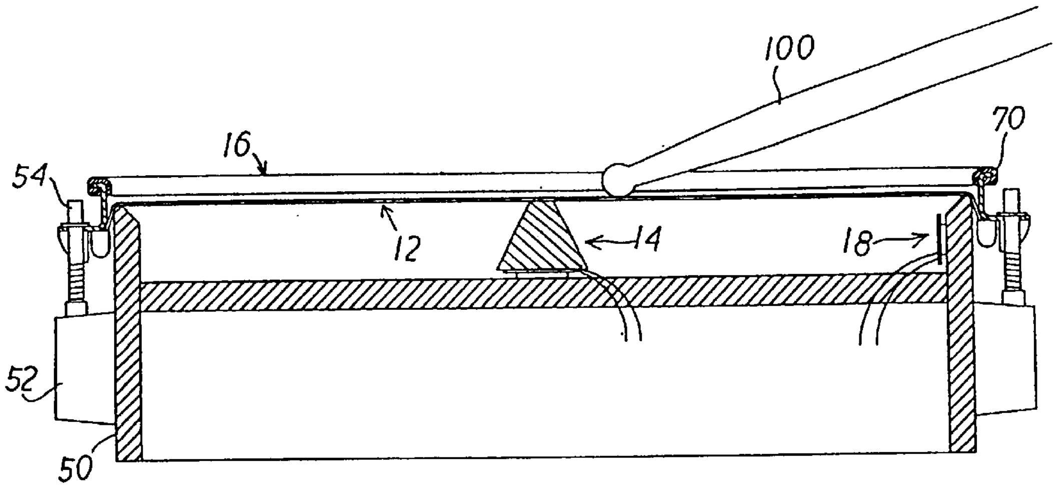
FIG. 8 is a sectional view corresponding to FIG. 3 in the case when the head is percussed with a stick.
Figure 9:
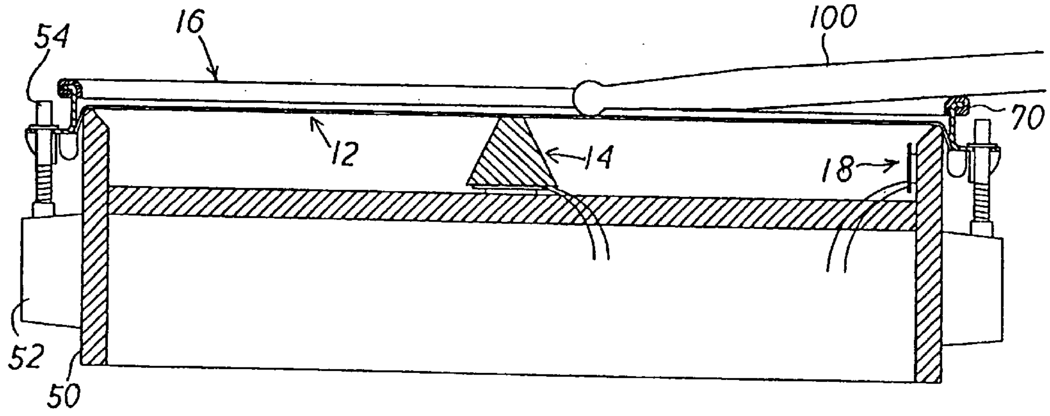
FIG. 9 is a sectional view corresponding to FIG. 3 in the case when the rim is percussed with a stick.
Figure 10:
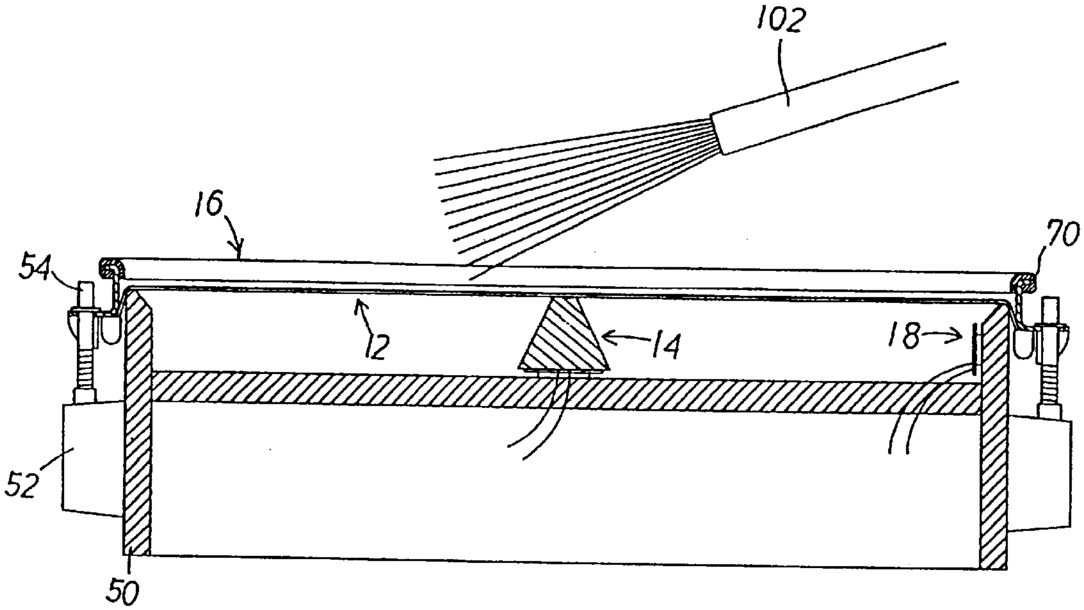
FIG. 10 is a sectional view corresponding to FIG. 3 in the case when the head is either brushed or percussed with a brush.

In the constitution as described above, when the head 12 is percussed with a stick 100 (see FIG. 8), the head sensor 14 detects the percussion, while when the rim 16 is percussed with the stick 100 (see FIG. 9, but it is to be noted that both the head 12 and the rim 16 are percussed with the stick 100 in FIG. 9), the rim-shot sensor 18 detects the percussion. Further, when the head 12 is brushed or percussed with a brush 102 (see FIG. 10), the head sensor 14 detects the contact of the brush 102 with the head 12.

In these circumstances, when the head 12 is percussed with the stick 100, extremely good percussion feeling closely resembling the percussion feeling in the case when the head of an acoustic drum is percussed can be obtained because of the elasticity of a net-like raw material composed of the first net 56 and the second net 58.

In addition, since the first net 56 and the second net 58 which have been woven in accordance with plane weaving manner wherein the longitudinal and transverse fibers cross at right angles are laminated obliquely with each other in the net-like raw material, the tension is uniformized over the whole surface of the net-like raw material, so that there is little variations in percussion feeling due to differences in the position percussed, and as a result, output waveforms from the head sensor 12 become the ones which are easily processed.

As described above, performance played by percussing the head 12 is controlled by output waveforms from the head sensor 14 being in contact with the under surface of the center in the first net 56 and the second net 58 of the head 12. In this respect, since the head sensor 14 is positioned at the center of the first net 56 and the second net 58 of the head 12, variations in output waveforms due to differences in the position of the head 12 percussed become concentric circular form, so that variations in tone color simulating acoustic drum are easily expressed.

Moreover, since the cushioning member 80 of the head sensor 14 is in contact with the under surface of the center of the second net 58 of the head 12, oscillation of the head 12 attenuates rapidly so that the output signal attenuates also rapidly, whereby erroneous detecting operation in case of percussing the head 12 in a rapid and repeated manner is prevented.

Further, since the cushioning member 80 bonded to the top of the piezoelectric 76 of the head sensor 14 is in contact with the second net 58 of the head 12 at the site of the frustoconical extreme end portion having a thin diameter and a small area, vibrations of percussion in the head 12 are hardly transmitted directly to the piezoelectric element 76, so that damage of the piezoelectric element 76 is suppressed.

In addition, since a diameter of the cushioning double-coated tape 78 bonded to the under surface of the piezoelectric element 76 is made to be equal to the node diameter, sensitivity of the piezoelectric element 76 increases, so that delicate variations in the oscillation due to differences in positions percussed can be more precisely detected.

Still further, since air passes through openings of stitches in the net-like raw material composed of the first net 56 and the second net 58, percussion sound in the case when the head 12 is percussed is extremely small. Such percussion sound in case of percussing the head 12 is dependent upon a ratio of openings in the net-like raw material composed of the first net 56 and the second net 58, and therefore, the higher ratio of openings brings about the smaller percussion sound. However, an excessive ratio of openings results in low tension of the first net 56 and the second net 58 so that the percussion feeling deteriorates. Accordingly, it is preferred to suitably keep a balance between the percussion feeling and the ratio of openings.

Yet further, since the rim 16 is covered with the covering member 70, the percussion sound in case of percussing the rim 16 is also reduced.

In this respect, the oscillation in case of percussing the rim 16 is mostly transmitted to the barrel 50, the performance played by percussing the rim 16 can be controlled in accordance with output waveforms in the rim-shot sensor 18 attached to the barrel 50.

In the following, electrical processing contents in the electronic percussion instrumental system according to the present invention will be described by referring to the accompanying flowcharts.

Figure 11:
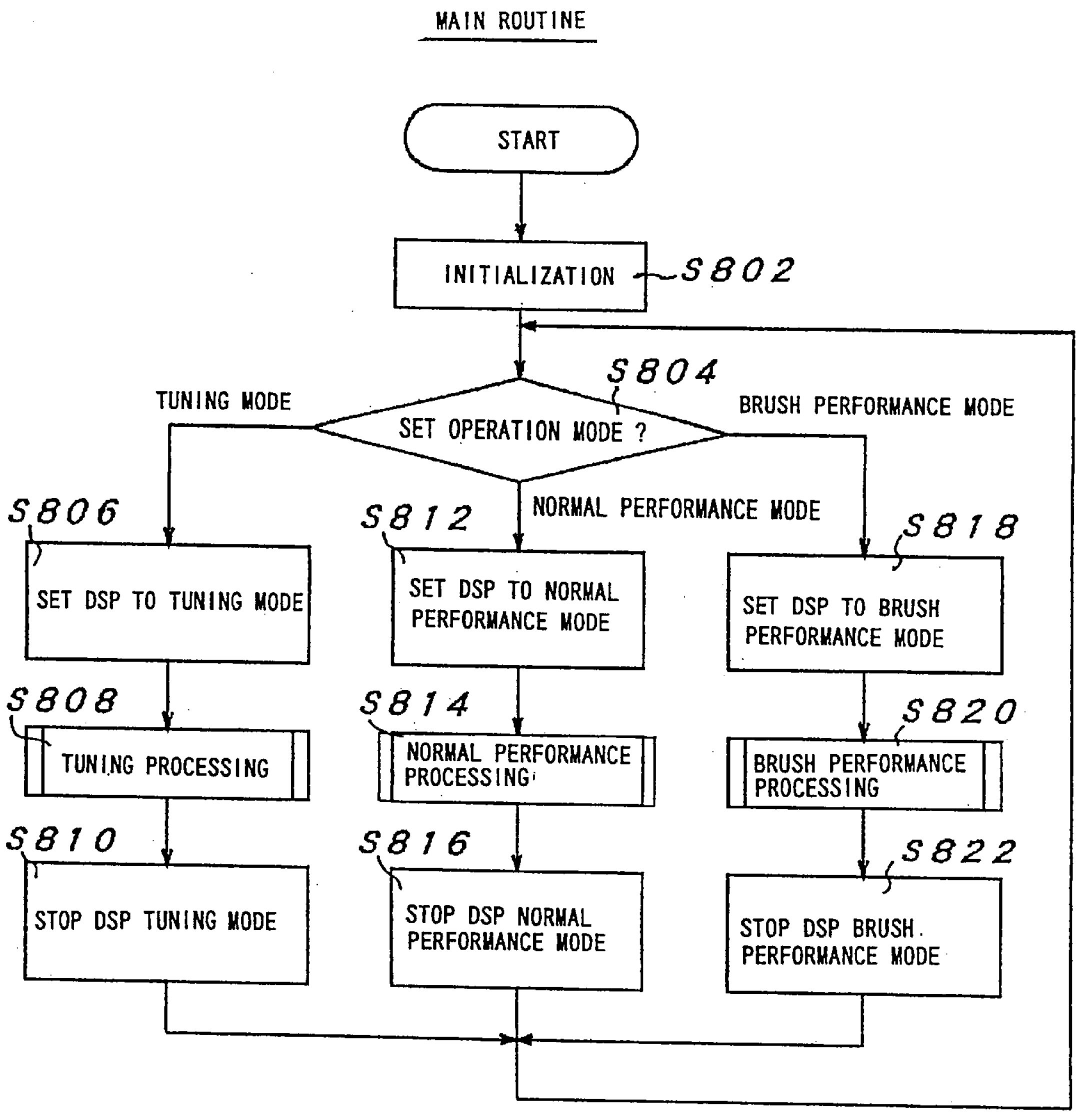
FIG. 11 is a flowchart of the main routine executed by a CPU.

FIG. 11 is a flowchart of the main routine executed by the CPU 24 wherein when the power is turned on, first, memories, registers and the like are initialized (step S802).

Then, it is judged which operational mode has been set, i.e., it is judged whether a tuning mode which changes percussion feeling of the head 12 by adjusting tension in the net-like raw material of the head 12, or a normal performance mode which sounds percussion instrumental sounds by detecting percussion upon the head 12 and percussion upon the rim 16, or a brushing performance mode which sounds percussion instrumental sounds by detecting either brushing or percussing the head 12 with the brush 102 has been established (step S804) by supervising an operational state of mode selecting keys of the group of operation keys 30.

Figure 12:
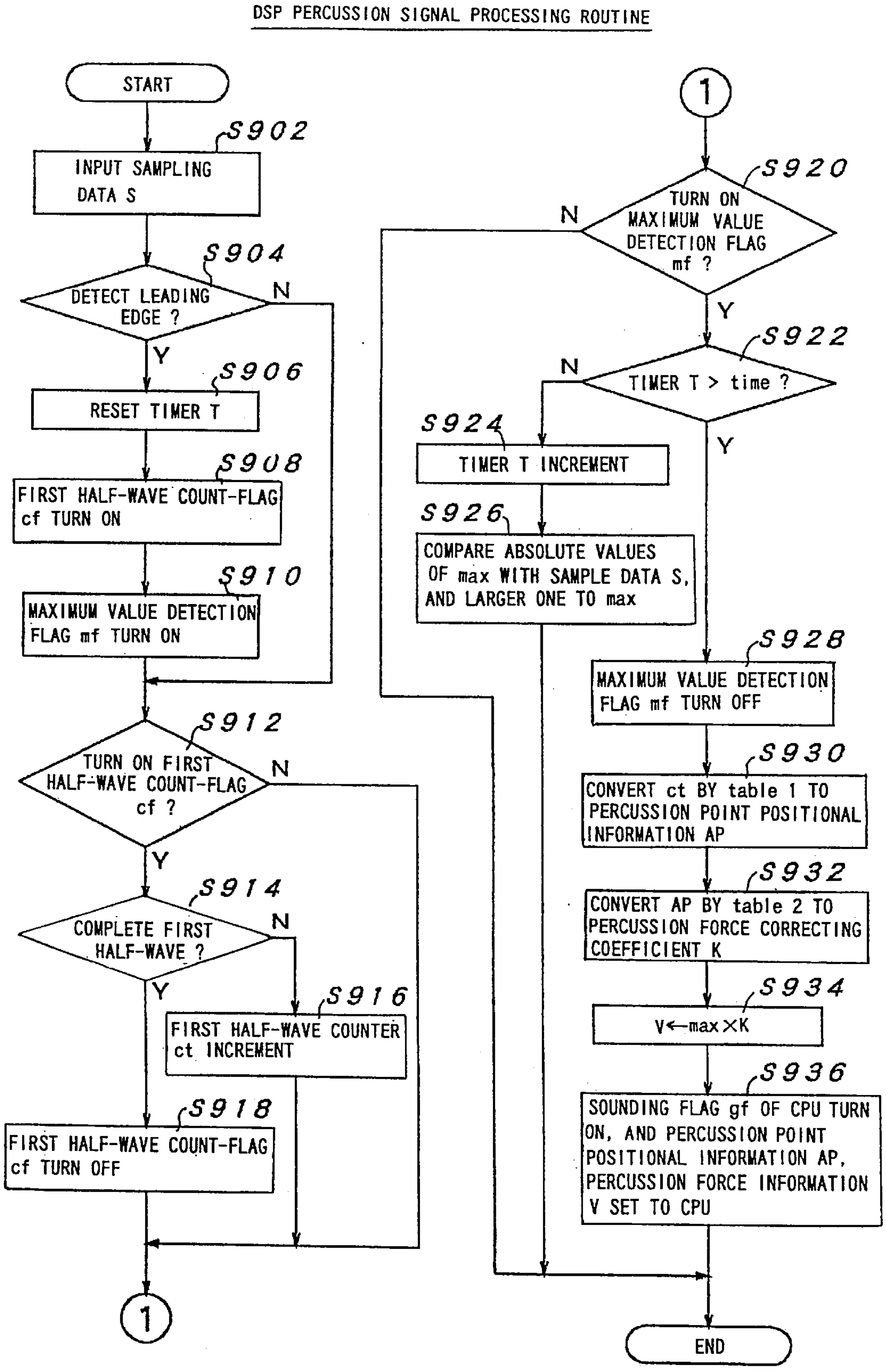
FIG. 12 is a flowchart of a DSP percussion signal processing routine executed by the DSP.
Figure 17:
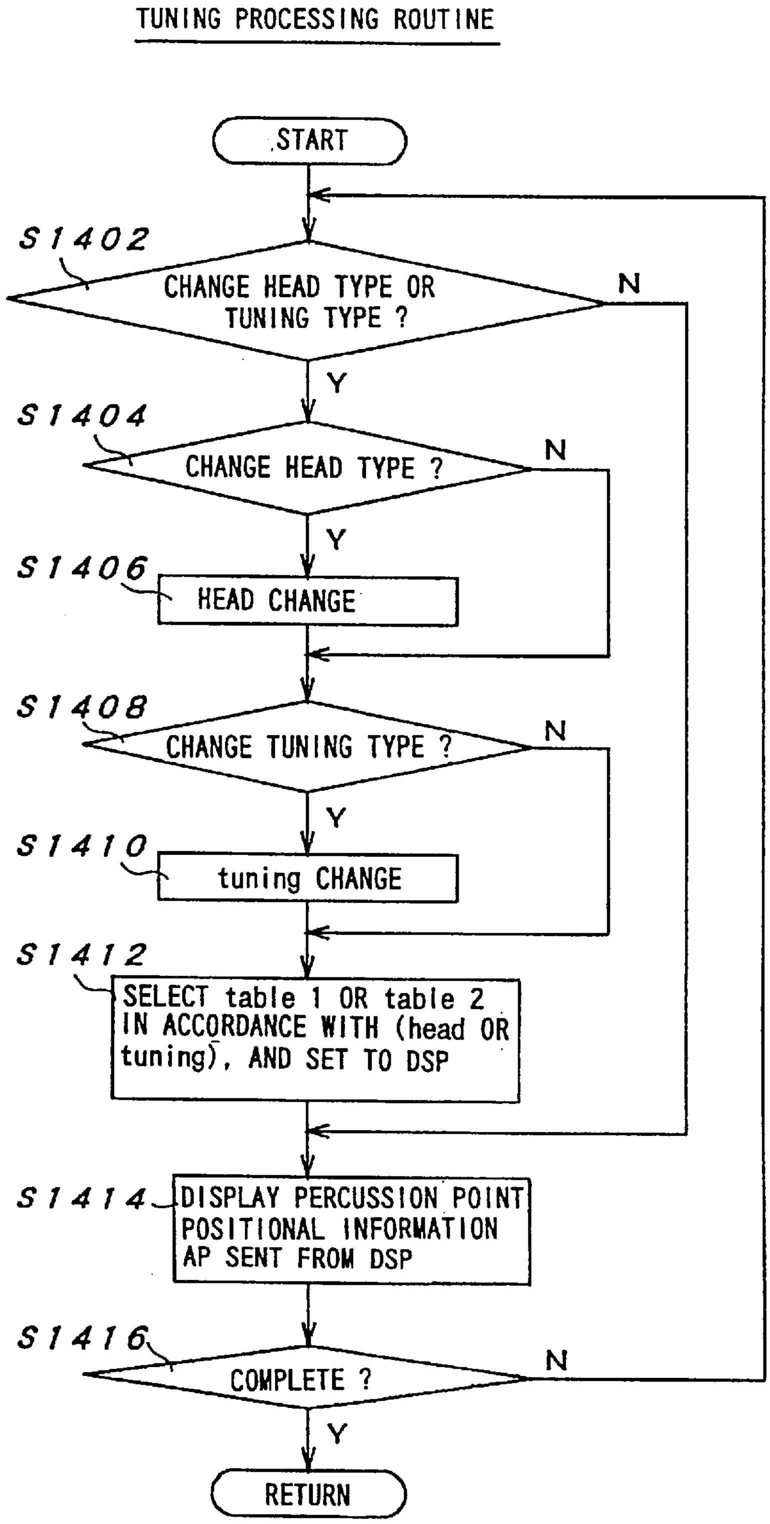
FIG. 17 is a flowchart of a tuning processing routine executed by the CPU.

As a result, when it has been judged that the tuning mode had been set in the step S804, the DSP 22 is set to the tuning mode, whereby the DSP 22 is adapted to be set so as to execute the DSP percussion signal processing routine shown in FIG. 12 (step S806). Thereafter, the tuning processing routine executed by the CPU 24 shown L in FIG. 17 is executed (step S808), then, processing for stopping the tuning mode by means of the DSP 22 is conducted (step S810), and the procedure returns to the step S804.

Figure 19:
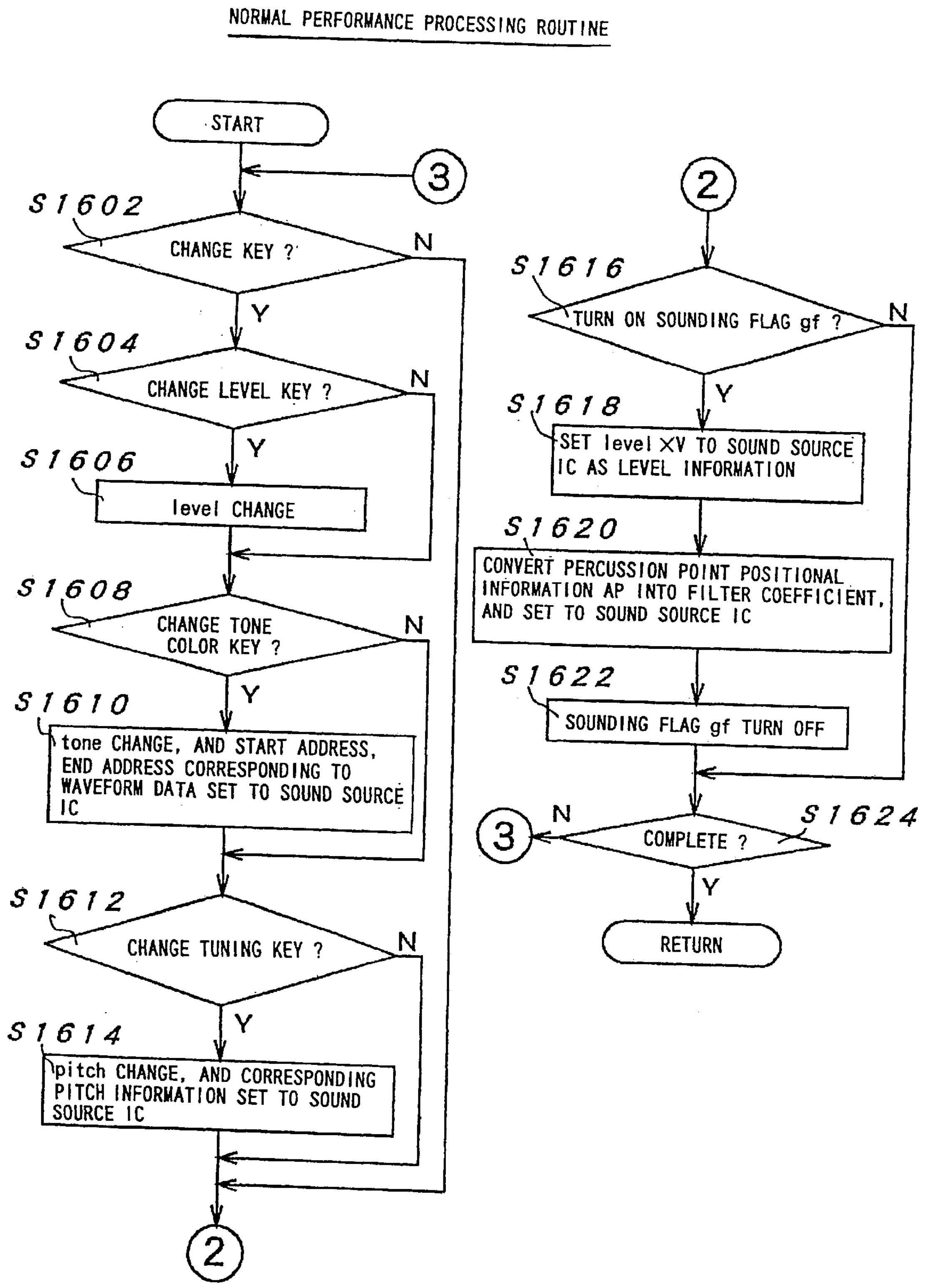
FIG. 19 is a flowchart of a normal performance processing routine executed by the CPU.

On one hand, when it has been judged that the normal performance mode had been set in the step S804, the DSP 22 is set to the normal performance mode, whereby the DSP 22 is adapted to be set so as to execute the DSP percussion signal processing routine shown in FIG. 12 (step S812). Thereafter, the normal performance processing routine by the CPU 24 shown in FIG. 19 is executed (step S814), then, processing for stopping the normal performance mode in the DSP 22 is conducted (step S816), and the procedure returns to the step S804.

On the other hand, when it has been judged that the brushing performance mode had been set in the step S804, the DSP 22 is set to the brushing performance mode (step S818). Thereafter, the brushing performance processing routine by the CPU 24 is executed, then, processing for stopping the brushing performance mode in the DSP 22 is conducted (step S816), and the procedure returns to the step S804. It is to be noted that since the processing for brushing performance mode is not related to the subject matter of the present invention, the detailed description therefor will be omitted.

In the following, the DSP percussion signal processing routine executed by the DSP 22 shown in FIG. 12 will be described, and the this processing is based on the following characteristic features.

Figure 13:
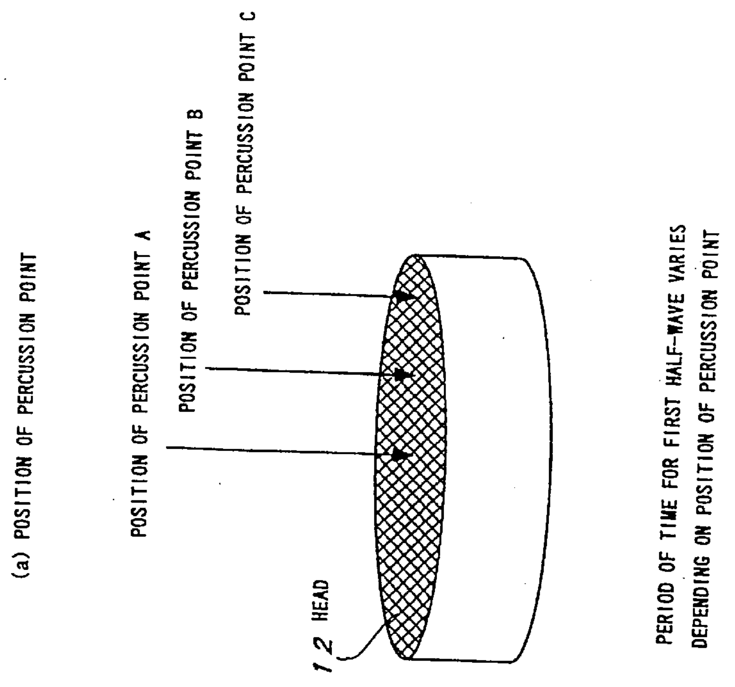
FIGS. 13(*a*) and 13(*b*) are explanatory views for characteristic properties of a head composed of a net-like raw material wherein FIG. 13(*a*) shows the positions of percussion point, and FIG. 13(*b*) shows the output waveforms, respectively.
Figure 13:
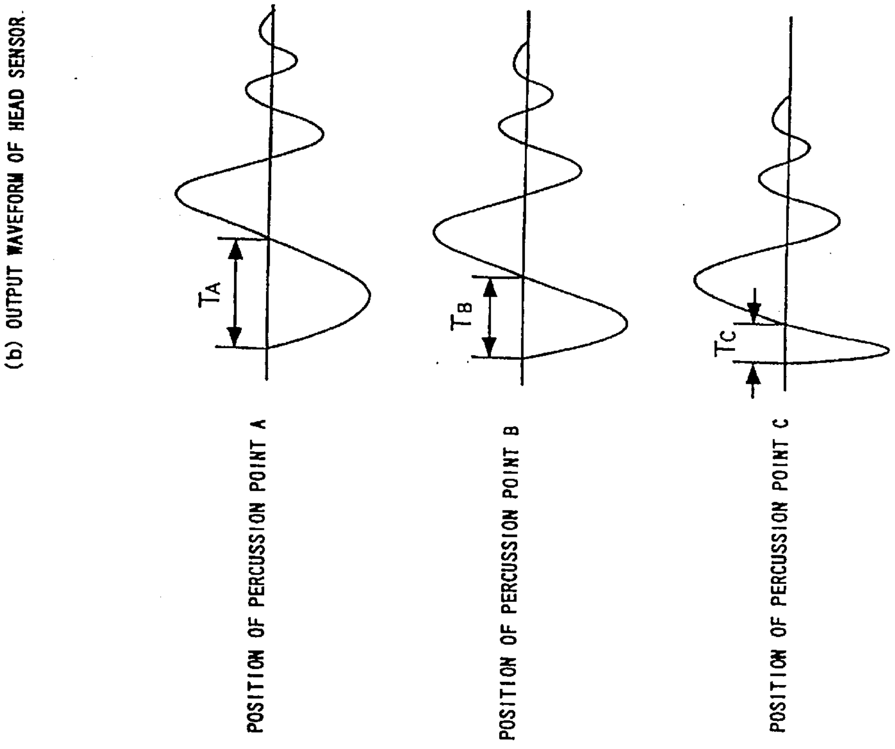

Namely, when detection signal of the head sensor 14 in the case when the head 12 composed of a net-like raw material is percussed is observed, there is such a characteristic that a first half-wave time changes dependent on a position of percussion point in a certain frequency band. More specifically, as shown in FIGS. 13(*a*) and 13(*b*), when the first half-wave time in the case where the center of the head 12 is percussed (position of percussion point A), the first half-wave time in the case where the outer circumference of the head 12 is percussed (position of percussion point C), and the first half-wave time in the case where the intermediate point defined between the center and the outer circumference of the head 12 is percussed (position of percussion point B) are represented by $T_A$, $T_C$, and $T_B$, respectively, the relationship between them is expressed as follows.

$T_A > T_B > T_C$.

As described above, when the head 12 composed of a net-like raw material is percussed, with the movement of position of the percussion point from the center to the outer circumference, a first half-wave time shortens gradually.

On one hand, when tuning of the head 12 is made high, i.e., tension of the head 12 is increased, the first half-wave times $T_A$, $T_B$, and $T_C$ shorten, respectively, while maintaining the relationship "$T_A > T_B > T_C$". On the other hand, when tuning of the head 12 is made low, i.e., tension of the head 12 is decreased, the first half-wave times $T_A$, $T_B$, and $T_C$ lengthen, respectively, while maintaining the relationship "$T_A > T_B > T_C$".

Figure 14:
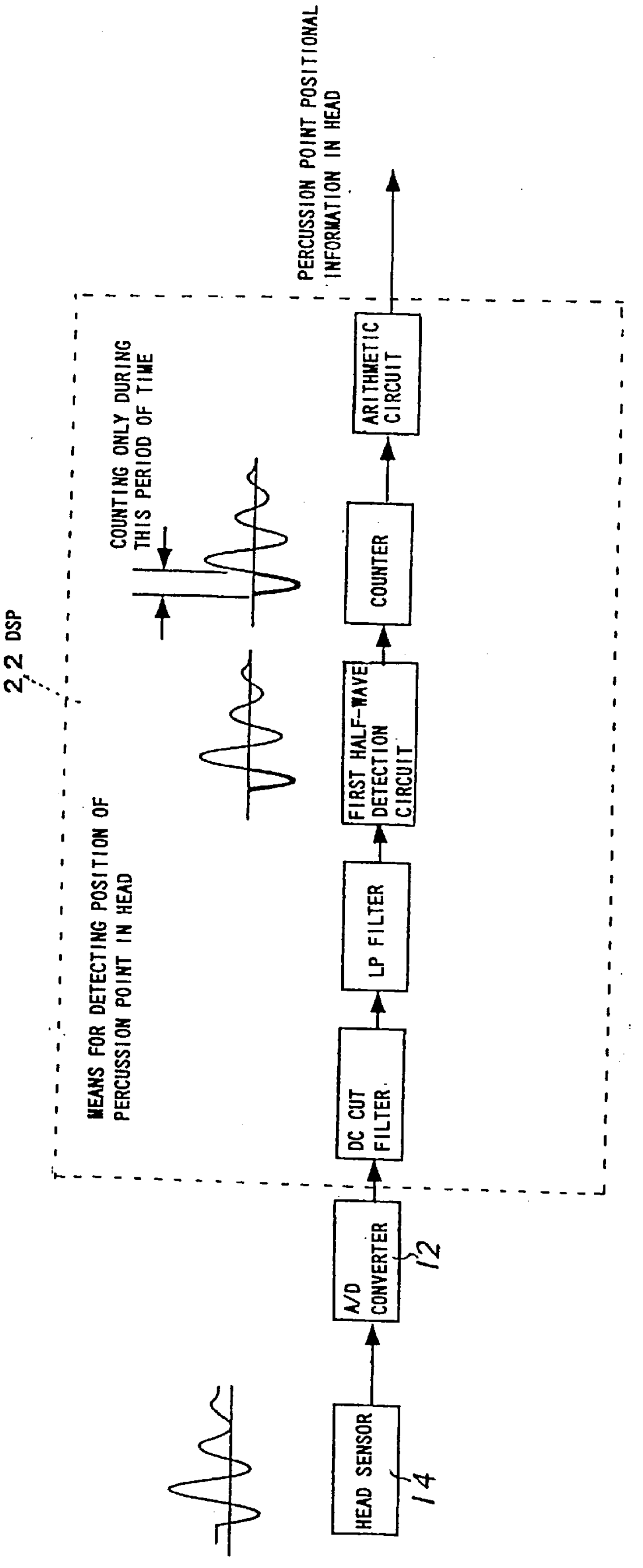
FIG. 14 is a functional block diagram showing the constitution of a means for detecting the position of percussion point in a DSP in a normal performance mode.

FIG. 14 is a functional block diagram showing the constitution of a means for detecting the position of percussion point in a DSP 22. The outline of DSP percussion signal processing routine will be described by referring to FIG. 14. A detection signal detected by the head sensor 14 is subjected to analog-to-digital conversion by means of the analog-to-digital converter 20, and the signal thus converted is input to a DC cut filter. The DC cut filter means a high pass filter for removing DC component. The DC component of the detection signal thus input to the DC cut filter is removed, and is input to a low pass filter (LP filter) removing unnecessary high pass component. Then, the detection signal from which unnecessary high pass component has been removed is input to a first half-wave detection circuit. The first half-wave detection circuit detects the leading edge of waveform of the detection signal thus input and the first zero cross, whereby the first half-wave is detected. A counter operates for counting during only a period wherein the first half-wave detection circuit detects first half-wave, and an arithmetic circuit calculates the position of percussion point from the count value of the counter. The position of percussion point thus calculated is input to the CPU 24 as percussion point positional information in head.

The DSP percussion signal processing routine will be described herein in detail by referring to FIG. 12 wherein this DSP percussion signal processing routine is executed repeatedly in every sampling periods of the analog-to-digital converter 12.

It is to be noted that since the above described functional block diagram shown in FIG. 14 indicates only the function for detecting percussion point positional information in head, a function for detecting percussion force information shown in FIG. 12 has been omitted. Furthermore, the functions for DC cut filter and LP filter shown in FIG. 14 are considered in FIG. 12 to be included in the processing for inputting sampling data S (step S902), so that the clear indication thereof is omitted for simplifying the flowchart.

In the DSP percussion signal processing routine, the sampling data S is first input (step S902), and it is judged whether the leading edge has been detected or not (step S904). In the case where it was judged that the leading edge had been detected, a timer T is reset (step S906), then, a first count flag of is turned ON (step S908), and a maximum value detection flag mf is turned ON (step S910).

The detection of leading edge in the step S904 may be conducted specifically by either a manner wherein a difference between the present sampling data S and the preceding sampling data is determined, and if the difference is higher than the prescribed value which has been previously set, it is judged that there was a leading edge, or a well-known manner for detecting leading edge of input signal.

Furthermore, the timer T is a means for measuring a prescribed period of time for detecting the maximum value of detection signal wherein the prescribed period of time is decided by a register time for storing the time which has been previously set.

The first half-wave count flag cf is a flag representing whether counting processing for the first half-wave counter ct is to be made or not. When the first half-wave count flag cf has been turned ON, the counting processing for the first half-wave counter ct is made, while the counting processing for the first half-wave counter ct is not made in the case when the first half-wave count flag cf has been turned OFF.

A maximum value detection flag mf is a flag representing whether detection processing for the maximum value of input data is to be made or not. When the maximum value detection flag mf has been turned ON, the detection processing for the maximum value is made, while the detection processing for the maximum value is not made, in the case when the maximum value detection flag mf has been turned OFF.

In either the case where the processing in step S910 has been completed or the case where it has been judged that the leading edge had not been detected in the step S904, the procedure proceeds to step S912 wherein it is judged whether or not the first half-wave count flag has been turned ON.

It is to be noted herein that the step S912, step S914, step S916, and step S918 relate to first half-wave count processing. In other words, the first half-wave count flag cf is turned ON from the step S912, and the first half-wave counter ct is incremental until the first half-wave is completed.

More specifically, when it is judged that the first half-wave count flag has not been turned ON, i.e., the first half-wave count flag has been turned OFF, the procedure jumps to step S920 without accompanying the processing in the step S914, the step S916, and the step S918.

On the other hand, when it is judged that the first half-wave count flag has been turned ON in the step S912, it is judged whether or not the first half-wave has been completed (step S914). Then, when it is judged that the first half-wave has not been completed, the first half-wave counter ct is made incremental (step S916), while when it is judged that the first half wave has been completed, the first half-wave count flag cf is turned ON (step S918), and the procedure proceeds to the step S920.

The completion of the first half-wave in the step S914 corresponds to a point of time where the sampling data cross 0 (zero). Judgment whether the sampling data have crossed 0 (zero) or not may be made at the point of time when sign of the sampling data S turns, the contents of the judgment being such that the sampling data have crossed 0 (zero).

In the step S920, it is judged whether the maximum value detection flag mf has been turned ON or not, and as a result, when it is judged that the maximum value detection flag mf has not been turned ON, i.e., it is judged that the maximum value detection flag mf has not been turned OFF, the DSP percussion signal processing routine is completed without taking a further step any more.

On the other hand, when it is judged that the maximum value detection flag mf has been turned ON, it is further judged whether or not a timer T is larger than the register time (step S922).

As a result, when the timer T is equal to or less than the register time, in other words, during a period where the maximum value detection flag mf has been turned ON and the timer T is equal to or less than the register time in the step S922, the maximum value detection processing is executed in step S924 and step S926.

More specifically, the timer T is made incremental (step S924), the maximum value max is compared with the absolute value of the sample data S to rewrite the larger value into the maximum value max (step S916), and the DSP percussion signal processing routine is completed.

Therefore, the maximum value max corresponds to the maximum value of a percussion signal within a prescribed time and decided by the register time.

Furthermore, when the maximum value detection processing is completed as a result of such judgment that the timer T is larger than the register time in the step S922, the maximum value detection flag mf is turned OFF (step S928).

Then, the first half-wave counter ct is converted into a percussion point positional information AP by employing table 1 which is a percussion point positional table for converting a first half-wave count value being a value of the first half-wave counter ct into the percussion point positional information AP (step S930).

It is to be noted herein that the table 1 which is a percussion point positional table for converting a first half-wave count value being a value of the first half-wave counter ct into the percussion point positional information AP is selected in accordance with head type or tuning type.

The head type is decided in response to a size of the head 12 so that TOM 1, TOM 2, and SNARE are established in the present electronic percussion instrumental system. On one hand, the tuning type is decided in accordance with a tuning state of the head 12, i.e., in response to tension of the head 12 so that "loose", "medium" and "tight" are established in the present electronic percussion instrumental system.

As described above, since three kinds of the head type and three kinds of the tuning type have been established in the present electronic percussion instrumental system, so that the table 1 of total nine kinds is provided.

Figure 15:
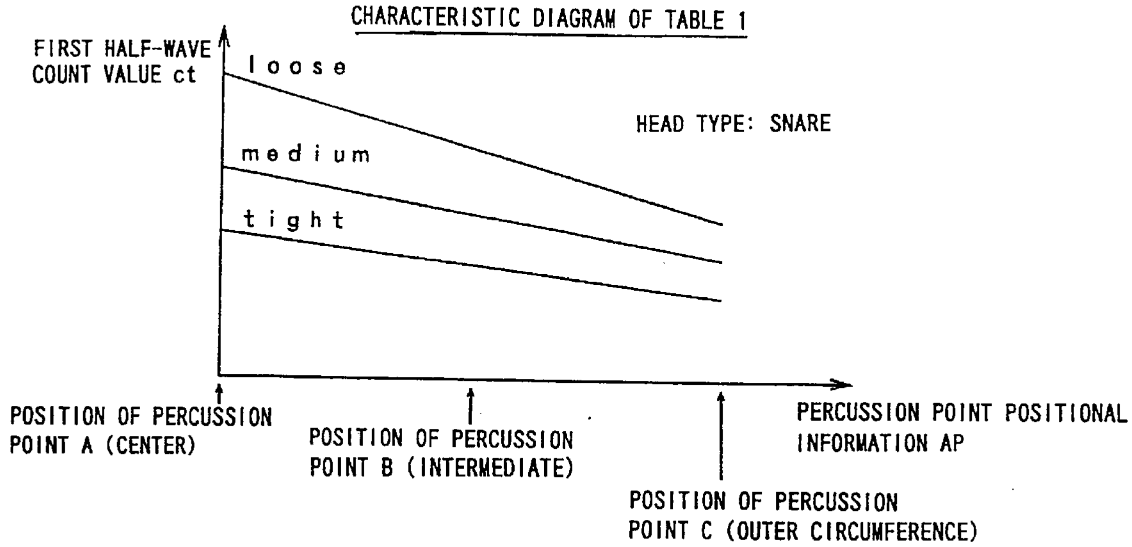
FIG. 15 is an explanatory diagram showing the characteristic properties of table 1.

In FIG. 15, characteristics of the respective tuning types of loose, medium, and tight are indicated in the case where the head type is SNARE in respect of the table 1. A position of percussion point A (center), a position of percussion point B (intermediate), and a position of percussion point C (outer circumference) in the percussion point positional information AP correspond to the position of percussion point A, the position of percussion point B, and the position of percussion point C in FIG. 10, respectively.

When completed the processing in the step 930, the procedure proceeds to step S932 wherein the percussion point positional information AIP is converted into a percussion force correcting coefficient K by employing a table 2 which is a percussion force correcting table for converting the percussion positional information AP obtained in the step S930 into the percussion force correcting coefficient K (step S932).

It is to be noted herein that the table 2 which is the percussion force correcting table for converting the percussion positional information AP is selected in response to head type and tuning type as in the case of the table 1.

As described above, since three kinds of the head type, i.e., TOM 1, TOM 2, and SNARE as well as three kinds of the tuning type, i.e., "loose", "medium", and "tight" have been established in the present electronic percussion instrumental system, so that the table 2 of total nine kinds is provided.

Figure 16:
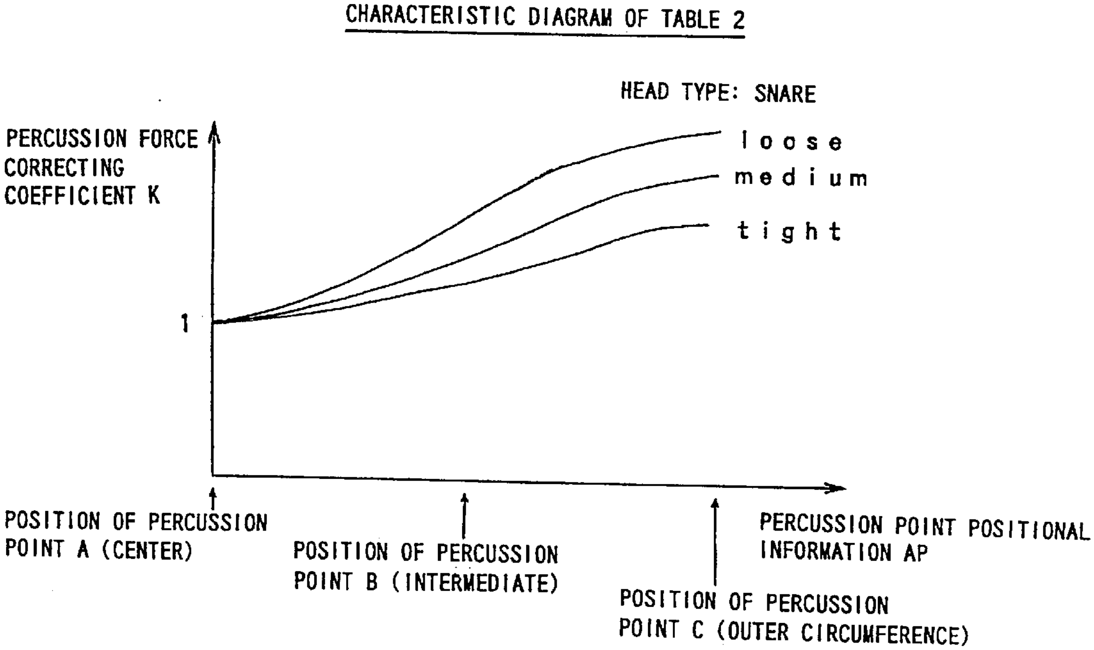
FIG. 16 is an explanatory diagram showing the characteristic properties of table 2.

In FIG. 16, characteristics of the respective tuning types of loose, medium, and tight are indicated in the case where the head type is SNARE in respect of the table 2. A position of percussion point A (center), a position of percussion point B (intermediate), and a position of percussion point C (outer circumference) in the percussion point positional information AP correspond to the position of percussion point A, the position of percussion point B, and the position of percussion point C in FIG. 10, respectively.

For instance, in the example shown in FIG. 16, when the tuning type is loose, "K=1" in the position of percussion point A (center), "K=4/3" in the position of percussion point B (intermediate), and "K=3" in the position of percussion point C (outer circumference).

These head types and tuning types may be represented by numerical values, and further the table 1 as well as the table 2 are not limited to the nine kinds, respectively.

When the processing in the step S932 is completed, the procedure proceeds to step S934 wherein compensation arithmetic processing in which the maximum value max is multiplied by the percussion force correcting coefficient K is conducted to calculate compensated percussion force information V.

When completed the step S934, the procedure proceeds to step S936 wherein a sounding flag gf in the CPU 24 is turned ON, the percussion point positional information AP and the percussion force information V are set in the CPU 24, and the DSP percussion signal processing routine is completed.

Then, the tuning processing routine executed by the CPU in the step S808 will be described by referring to FIG. 17.

In this tuning processing routine, it is judged whether or not there was an indication of change in a head type or a tuning type by operating a head type setting operation key (key for setting the head type) or a tuning type setting operation key (key for setting the tuning type) contained in the group of operation keys 30 (step S1402). At the time of turning on the power, a register head storing a head type and a register tuning storing a tunig type are also set in response to the initialized state of the head type setting operation key and the tunig type setting operation key in accordance with the processing of initialization in the step S802, respectively.

After such judgement that change of head type or tuning type had been indicated by the operation of the head type setting key or the tuning type setting key of the group of operation keys 30 in the step S1402, it is judged whether or not the change of head type has been indicated (step S1404).

When it was judged that the change of head type had been indicated, stored contents of the register head are changed in accordance with this indication of change (step S1406).

In either the case where the processing in step S1406 has been completed, or the case where it was judged that the change of head type had not been indicated in the step S1404, it is judged whether or not the change of tuning type has been indicated (step S1048).

When it was judged that the change of tuning type had been indicated, the stored contents of the register tuning is changed in accordance with this indication of change (step S1410).

In either the case where the processing in step S1410 has been completed, or the case where it was judged that the change of tuning type had not been indicated in the step S1408, the table 1 or the table 2 is selected in accordance with the stored contents of the register head or the register tuning, and it is set to the DSP 22 (step S1412).

As a result of conducting the procedure as described above, in either the case where the processing in step S1412 has been completed, or the case where it was judged that both the head type setting key or the tuning type setting key in the group of operation keys 30 had not been operated so that no change of the head type and the tuning type had not been indicated, the percussion point positional information AP sent out from the DSP 22 is displayed on the display unit 32 (step S1414). More specifically, the percussion point positional information AP set in the CPU in the DSP percussion signal processing routine is displayed on the display unit 32.

Figure 18:
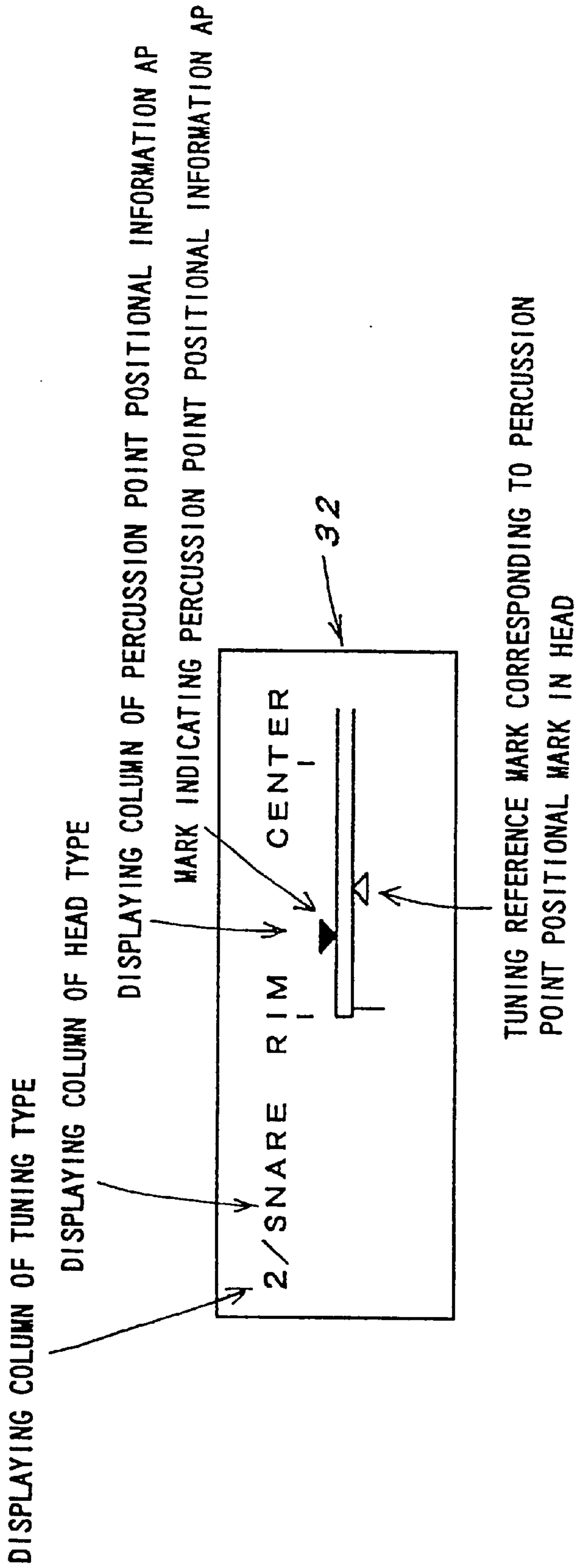
FIGS. 18(*a*), 18(*b*), and 18(*c*) are explanatory diagrams showing examples of display mode in percussion point positional information AP by means of a display unit wherein FIG. 18(*a*) shows the first displaying example, FIG. 18(*b*) shows the second displaying example, and FIG. 18(*c*) shows figures indicating a variety of the percussion point positional information AP in the display column for the percussion point positional information AP in FIG. 18(*b*), respectively.
Figure 18:
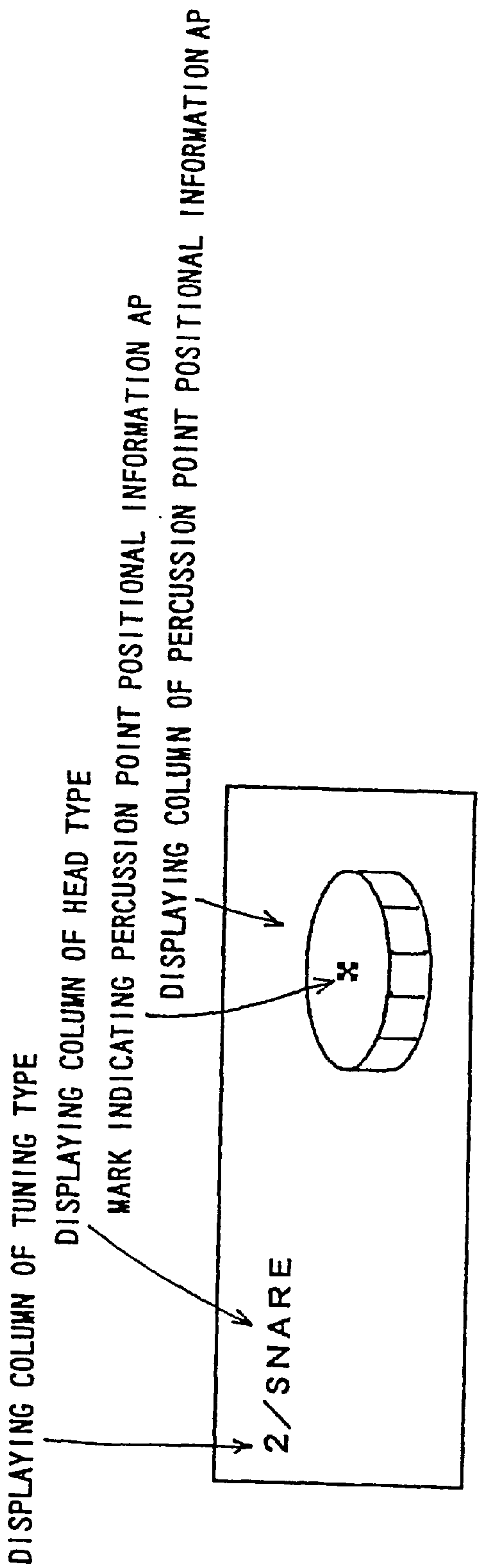
Figure 18:
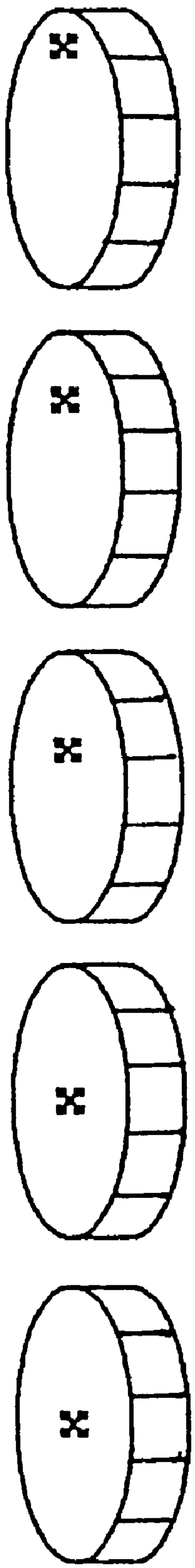

In FIGS. 18(*a*), 18(*b*) and 18(*c*) are shown examples of manner of displaying the percussion point positional information AIP displayed on the display unit 32 in the step S1414 wherein FIG. 18(*a*) shows a first displaying example, FIG. 18(*b*) shows a second displaying example, and FIG. 18(*c*) shows marks representing a variety of percussion point positional information AP being displayed in a display column for the percussion point positional information AP in FIG. 18(*b*), respectively. In FIGS. 18(*a*) and 18(*b*), it is arranged in such that numbers which have been previously assigned to respective tuning types are displayed in the displaying column of tuning type.

In FIG. 18(*a*), "CENTER" indicates the center position of the head 12, and "RIM" indicates a position of the rim 16. Furthermore, a black triangle is a mark indicating the percussion point positional information AP, while a white triangle is a tuning reference mark indicated in a position corresponding to the percussion point positional mark M indicated in the head 12 (see FIG. 20).

Since a position between the center "CENTER" and the rim 16 "RIM" in the head 12 is decided by the percussion point positional information AP, the position thus decided is indicated by a black triangle.

Furthermore, the tuning reference mark represented by a white triangle shows a position corresponding to the percussion point positional mark M indicated in the head 12 shown in FIG. 20 as described above. Namely, since the percussion point positional mark M shown in FIG. 20 is indicated at the position of intermediate point between the center "CENTER" and the rim 16 (RIM) in the head 12, the tuning reference mark represented by a white triangle is also indicated at the intermediate point between the "CENTER" and the "RIM" in FIG. 18(*a*).

The manner for displaying the percussion point positional information AP on the display 32 is not limited to the examples shown in FIGS. 18(*a*), 18(*b*), and 18(*c*), but it may be indicated by either numerical values or a bar graph as in a level indication.

When completed the processing in the step S1414, it is judged whether or not a termination key in the group of operation keys 30 has been operated (step S1416), so that if it was judged that the termination key in the group of operation keys 30 had not been operated, the procedure returns to the step S1402, and the processing is repeated.

On the other hand, if it was judged that the termination key in the group of operation keys 30 had been operated in the step S1416, the procedure returns to the main routine.

Then, a normal performance processing routine executed by the CPU 24 in the step S814 will be described by referring to FIG. 19.

In the normal performance processing routine, it is first judged whether or not a level key (key for setting a volume of sounding musical tone), a tone color key (key for setting tone color of sounding musical tone), or a tuning key (key for setting a pitch of sounding musical tone) contained in the group of operation keys 30 has been changed. At the time when the power is turned on, a register level for storing level, a register tone for storing tone color, and a register pitch for storing pitch are set in response to the initialized state of the level key, the tone color setting key, and the tuning key, respectively, in accordance with the initialization processing in the step S802.

In the step S1602, when it was judged that the level key, the tone color setting key, or the tuning key in the group of operation keys 30 had been changed, then, it is judged whether the level key has been changed or not (step S1604).

In this case, if it was judged that the level key had been changed, the stored contents in the register level are changed in accordance with the former change (step S1606).

In either the case where the processing in step S1606 has been completed, or the case where it was judged that the level key had not been changed in the step S1604, it is judged whether or not the tone color key has been changed (step S1608).

In this case, when it was judged that the tone color key had been changed, stored contents of a register tone are changed in accordance with the former change, and a start address and an end address of waveform data corresponding to the stored contents of the register tone are set in the sound source IC 34 (step S1610).

In either the case where the processing in step S1610 has been completed, or the case where it was judged that the tone color key had not been changed in the step S1608, it is judged whether or not the tuning operation key has been changed (step S1612).

It is to be noted that the "tuning" in this step S1612 is different from the above described tuning of the head, and it means that a pitch is adjusted with respect to sounding musical tone (sound of a percussion instrument).

In this case, when it was judged that the tuning key had been changed, stored contents of the register pitch are changed in accordance with the former change, and the pitch information corresponding to the stored contents of the register pitch are set to the sound source IC 34 (step S1614).

When the processing in step S1614 has been completed as a result of conducting the procedure as described above, or it was judged that the tuning key had not been operated in the step S1612, or in the case where any of the level key, tone color setting key, or the tuning key in the group of operation keys 30 had not been changed, then, it is judged whether or not a sounding flag gf is turned ON (step S1616).

Specifically, it is judged whether or not sounding has been instructed as a result of turning ON the sounding flag gf of the CPU 24 in the step S936 of the DSP percussion signal processing routine.

In this case, if it was judged that the sounding flag gf had been turned ON, the results of arithmetic computations of "level x V" are set to the sound source IC 34 as the level information (step S1618). More specifically, values stored in the register level which has been set by a level key are multiplied by percussion force information V to calculate a sounding level, and the results of this arithmetic computations are set to the sound source IC 34 as the level information.

When completed the processing in the step S1618, the percussion point positional information AP is converted into a filter coefficient for controlling filter characteristics, and the converted information is set in the sound source IC 34 (step S1620). More specifically, when the converted information is set to the IC 34 after converting the percussion point positional information AP into the filter coefficient for controlling filter characteristics, tone colors corresponding to the positions of percussion point can be obtained. It is to be noted that the processing for obtaining tone colors corresponding to the positions of percussion point is not limited to that illustrated in the step S1620, but the processing in the step S1620 may be replaced by either a manner wherein waveforms to be read out are switched or a manner wherein a mixed ratio of a plurality of waveforms is changed.

When the processing in the step S1620 is completed, the sounding flag gf is turned OFF (step S1622). In other words, as a result of conducting the procedure as described above, the sounding flag is turned OFF.

In either the case where the processing in the step S1622 has been completed, or the case where it was judged that the sounding flag gf had been turned OFF in the step S1616, it is judged whether or not the termination key in the group of operation keys 30 has been operated (step S1624), so that if it was judged that the termination key of the group of operation keys 30 had not yet been operated, the procedure returns to the step S1602 to repeat the processing.

On the other hand, when it was judged that the termination key in the group of operation keys 30 had been operated, the procedure returns to the main routine.

The processing for sounding musical tones from the present electronic percussion instrumental system to the outside is carried out by controlling the sound source IC 34.

Figure 21:
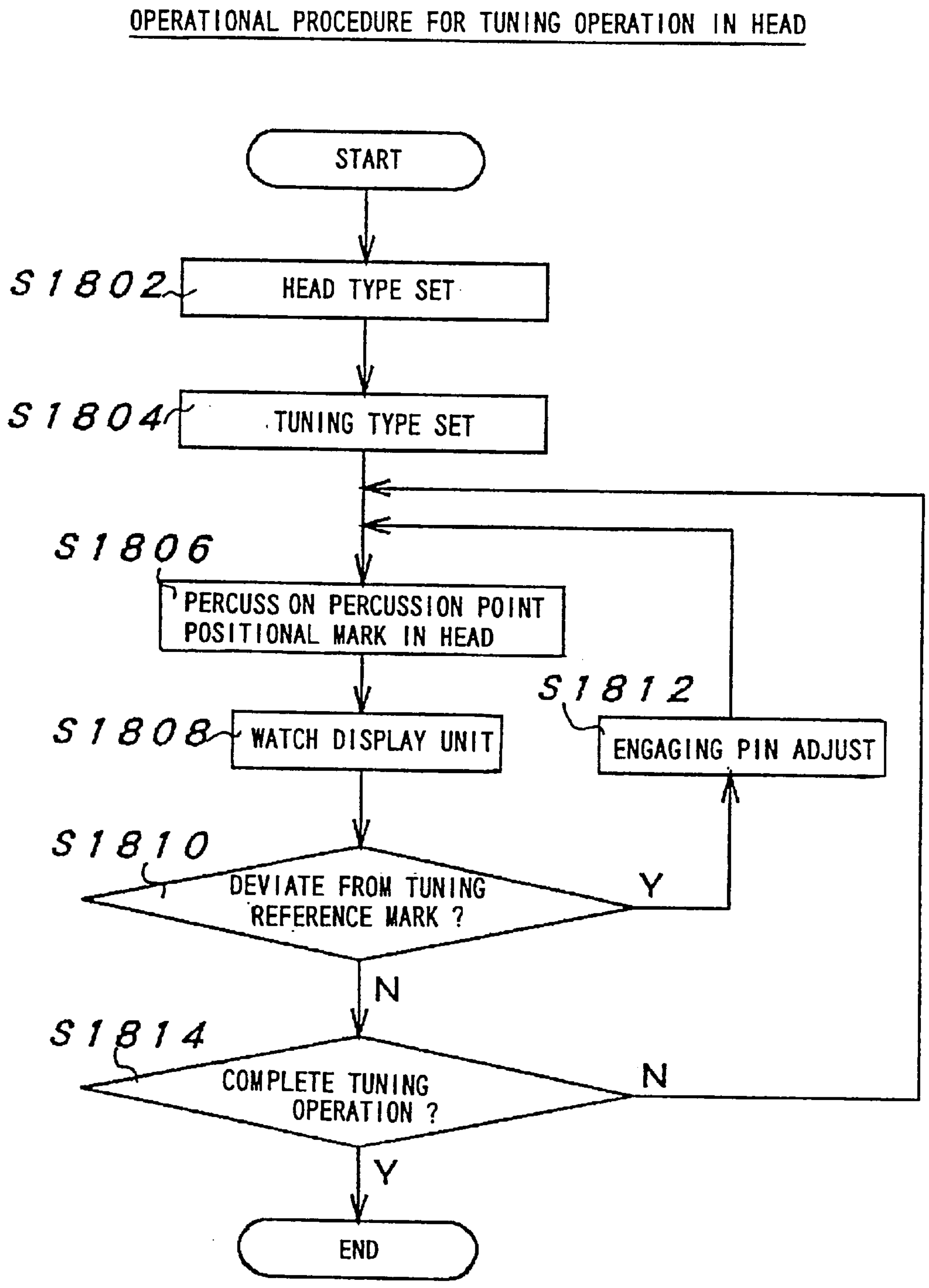
FIG. 21 is a flowchart showing a typical operational procedure for the tuning operation of a head.

In the following, a typical operational procedure for tuning operation of the head 12 will be described by referring to the flowchart shown in FIG. 21. The flowchart of FIG. 21 illustrates the operational procedure of the tuning operation effected by a user after selecting the tuning mode by the user.

Namely, when the user selects the tuning mode, then he or she sets first a desired head type by operating a head type setting key in the group of operation keys 30 (step S1802), and thereafter, he or she sets a desired tuning type by the operation of a tuning type setting key of the group of operation keys 30 (step S1804).

In accordance with the operations in the steps S1802 and S1804, the processing specified in the respective steps S1402, S1404, S1406, S1408, S1410, and S1412 contained in the tuning processing routine executed by the CPU shown in FIG. 17 is conducted.

Then, in this tuning operation, a mark M at the position of percussion point in the head 12 which is placed at a position close to the engaging pin 54 in operation is percussed (step S1806). It is to be noted that the procedure on and after the step S1806 becomes actual tuning operations.

In the step S1806, when the mark M at the position of percussion point of the head 12 is percussed, the percussion point positional information AP sent from the DSP 22 as a result of execution of percussion signal processing routine shown in FIG. 12 is displayed on the display unit 32 in the step S1414 contained in the tuning processing routine executed by the CPU shown in FIG. 17.

In this case, it is confirmed that a black triangle indicating the percussion point positional information AP due to the result of the percussion in the step S1806 has been displayed at which position by visual observation of the display unit 32 (step S1808).

Then, it is judged whether or not there is a misregistration between the position of the black triangle indicating the percussion point positional information AP and a white triangle indicating the tuning reference mark (step S1810).

In this case, when it is judged that there is a misregistration between the position of the black triangle indicating the percussion point positional information AP and the white triangle indicating the tuning reference mark, the engaging pin 54 is adjusted so as to cancel the aforesaid misregistration, thereby carrying out tuning for adjusting tension of the head 12 (step S1812).

Thus, after completing the operation in the step S1812, the procedure returns to the step S1806 and the operation is repeated.

On the other hand, if it was judged that there was no misregistration between the position of the black triangle indicating the percussion point positional information AP and the white triangle indicating the tuning reference mark, then it is judged whether the tuning operation has been completed or not (step S1814). In this case, the judgment whether or not the tuning operation has been completed is specifically a judgment whether or not tuning operations of all the engaging pins 54 have been completed.

In this case, when it was judged that the tuning operations had not been completed, the procedure returns to the step S1806 to perform tuning operations with respect to the engaging pins 54 to which have not yet been subjected the tuning operations.

On the contrary, when it was judged that the tuning operations had been completed, the procedure of the tuning operation is finished.

It is to be noted that the above described manner of practice may be modified as follows.

Figure 22:
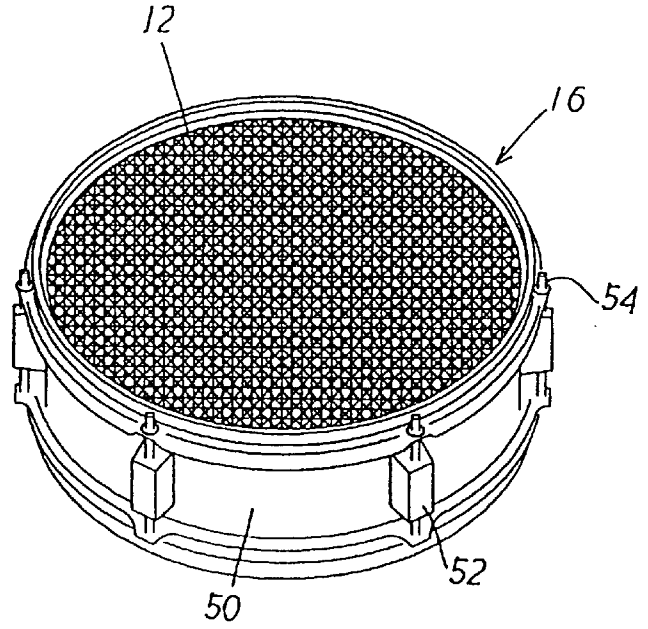
FIG. 22 is a perspective view showing a modified example of the percussion detecting apparatus corresponding to FIG. 2.

(1) As shown in FIG. 22, the head 12 is fixed to either side of the opening of the barrel section 50, while the head of an acoustic drum (cannot be found in FIG. 22) may be fixed to the other side of the opening of the barrel section. In this case, when the head 12 is percussed, the head of acoustic drum positioned on the opposite side resonates to sound at an appropriate volume. Accordingly, when compared with the case where only the head 12 is fixed to the barrel section 50, a player can perform the percussion instrument with much more close feeling to that of acoustic drum.

Figure 23:
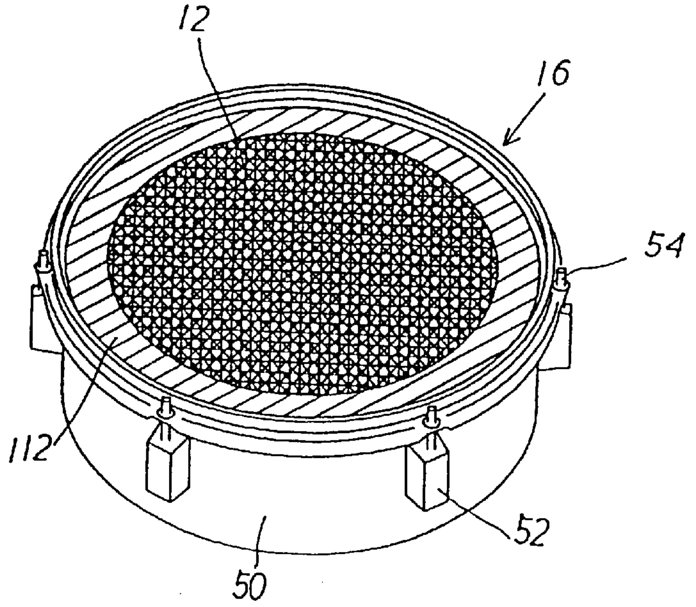
FIG. 23 is a perspective view showing a modified example of the percussion detecting apparatus corresponding to FIG. 2.

(2) As shown in FIG. 23, to the outer circumference of the head 12 composed of the first net 56 and the second net 58 may be bonded an annular film 112. In this case, since a ratio of opening in the first net 56 and the second net 58 of the head 12 becomes low in comparison with that of the above described manner of practice, the percussion sound becomes larger than that of the above described manner of practice. For this reason, a player can perform the resulting percussion instrument with much more close feeling to that of acoustic drum. Furthermore, when an area of the film 112 to be bonded to the first net 56 and the second net 58 in the head 12 is allowed to vary, the volume in percussion can be controlled. Moreover, stitches may be filled with an adhesive to bond the first net 56 to the second net 58 in place of bonding of the film 112.

(3) The net-like raw material is not limited to a two-ply plane weave net, but one-ply or three—or more ply net may also be used. Furthermore, a weaving manner of net is not limited merely to plane weave. In the case where a net-like raw material is composed of a single net, it is preferred to use a triaxially woven net which balances tension not only in the crossed direction of woven fibers, but also in an oblique direction.

(4) A shape of the cushioning member 80 in the head sensor 14 is not limited to the frustoconical shape, but a truncated pyramid shape may be adopted.

(5) A constitution of the sound source is not limited to the above described wave-form read-out system, but sound sources of a variety of systems may be employed. Furthermore, a PCM sound source sounding PCM sampling sounds is not used, but a resonator composed of oscillator and the like may be used, otherwise audio signals input from the outside may also be employed.

(6) While the percussion point positional information AP has been displayed on the display 32 in the above described manner of practice, instead of the display, it may be adapted to sound such sound signal having a pitch corresponding to the percussion point positional information AP.

Figure 24:
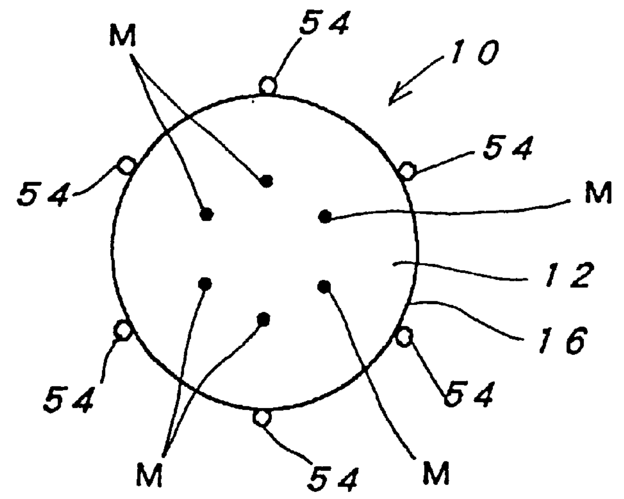
FIGS. 24(*a*) and 24(*b*) are schematic top views of a percussion detecting apparatuses each showing an example of percussion point positional mark displayed on the top of the head wherein FIGS. 24(*a*) and 24(*b*) show different examples from each other.
Figure 24:
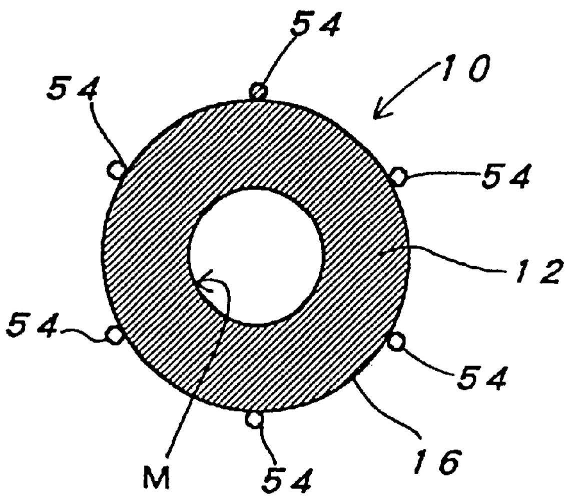

(7) Although the percussion point positional mark M indicated on the top of the head 12 has been configured in the circular shape as shown in FIG. 20 in the above described manner of practice, a shape of the percussion point positional mark M is not limited to the circular shape as shown in FIG. 20, but, for example, the percussion point positional mark M may be indicated by points of a prescribed number as shown in FIG. 24(*a*). Moreover, a region of the head 12 is classified by coloring as shown in FIG. 24(*b*) (it is to be noted in FIG. 24(*b*) that a shaded portion of the region of the head 12 is represented by a different color from that of the other (no shaded) portion), and the boundary portion classified by coloring may be used as the percussion point positional mark M.

(8) While it has been arranged in such that the tuning reference mark represented by white triangle shown in FIG. 18(*a*) is indicated in response to the percussion point positional mark M of the head 12 in the above described manner of practice, the invention is not limited thereto, but, for instance, it may be arranged in such that information for indicated position by a white triangle may be stored as the tuning reference data together with the table 1 and the table 2 which are selected in accordance with the head type or the tuning type set in the tuning processing routine executed by the CPU shown in FIG. 17.

Figure 25:
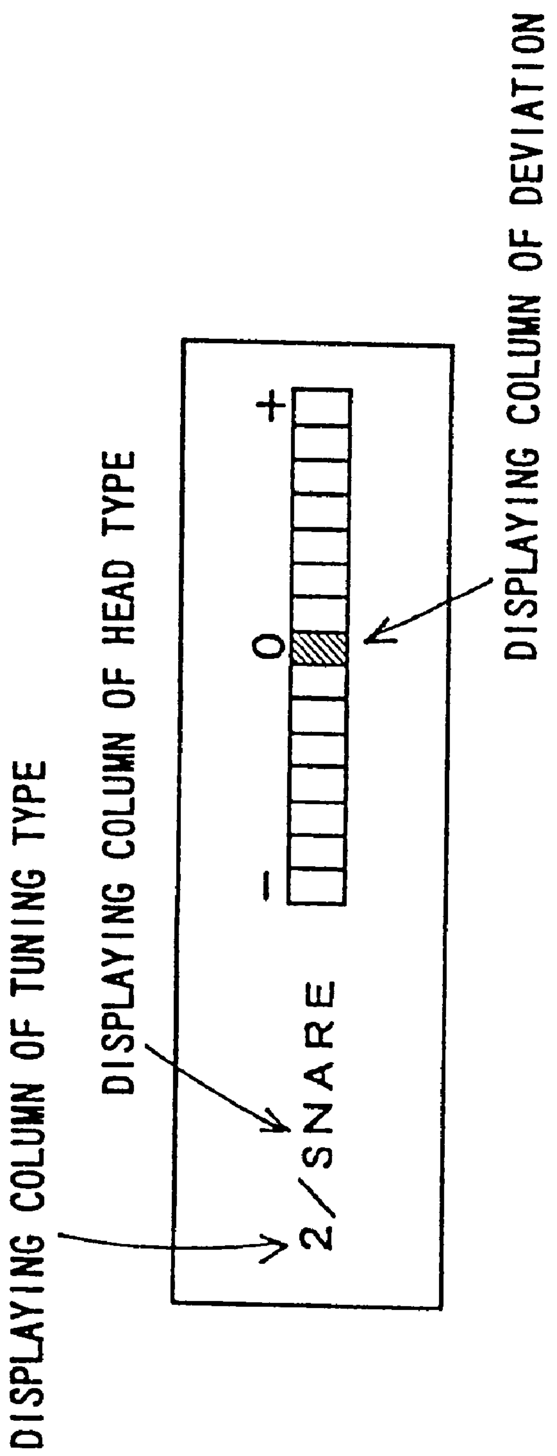
FIG. 25 is an explanatory view showing another example of display mode in the percussion point positional information AP by means of a display unit.

(9) Although the black triangle indicating the percussion point positional information AP and the white triangle indicating the tuning reference mark corresponding to the percussion point positional mark M of the head have been displayed on the display unit 32 in the above described manner of practice as shown in FIG. 18(*a*), a displaying manner on the display unit 32 is not limited thereto, but, for example, a deviation between the above described tuning reference data and the detected percussion point positional information AP may be displayed as shown in FIG. 25.

Specifically, the manner may be carried out in such a way that tuning reference data are read out in case of the processing for displaying the percussion point positional information AP in the step S1414 of the tuning processing routine executed by the CPU shown in FIG. 17, a deviation between the tuning reference data and the percussion point positional information AP is calculated, and the deviation represented by the calculated result is displayed on the display unit 32. If it has been adapted to display "0" on the display unit 32 in case of no deviation, it means that tuning is matched in the case when indication "0" is displayed on the display unit 32.

(10) As a displaying manner in the display unit 32, there are a manner wherein it may notify that the tuning is matched in the case when a difference between the tuning difference data and the percussion point positional information AP reaches a prescribed value or lower, and a manner wherein a difference between the tuning reference data and the percussion point positional information AP may be displayed in accordance with cent indication as utilized in a tuning device for stringed instruments such as guitar and the like in addition to the manners described above.

Since the present invention has been constituted as described above, it provides such an excellent advantage that a percussion detecting apparatus, which is excellent in percussion feeling, and the percussion sounds of which are very small, in electronic percussion instrumental system can be realized.

Furthermore, since the indication corresponding to a percussion position of the head has been made in the present invention, such an excellent advantage that correct tuning can easily be carried out in case of tuning the head is obtained.

Moreover, since a variation in tension of the head due to tuning of the head has been compensated in the present invention, such an excellent advantage that correct percussion position can be detected is obtained.

Still further, since a tuning operation can be conducted by a user in accordance with such a manner that a place marked with a percussion point positional mark is percussed by the user, and the result detected at that time by the detecting means for position of percussion point is confirmed while watching the display means in the present invention, such an excellent advantage that tuning operation can simply be carried out without relying upon user's sense is obtained.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Applications No. 8-193986 filed on Jul. 4, 1996, No. 9-15846 filed on Jan. 13, 1997 and No. 9-15847 filed on Jan. 13, 1997 including specification, claims, drawings and summary are incorporated herein by reference in their entirety.

What is claimed is:

1. An electronic percussion instrument system comprising:

a barrel section having a first end;

a head disposed in a tensioned state across the first end of the barrel section to define a percussion surface for receiving a percussion impact and a second surface facing opposite the percussion surface, the head having a plurality of openings through which air may pass; and a cushioning member and a transducer supported within the barrel section, with the cushioning member in contact with a portion of, but less than the entire surface area of the second surface of the head, wherein a portion of the second surface of the head is out of contact with the cushioning member to allow air to pass through the openings in the head.

2. An electronic percussion instrument system as recited in claim 1, wherein the head comprises a net-like material.

3. An electronic percussion instrument system as recited in claim 1, wherein the head comprises multiple layers of net material.

4. An electronic percussion instrument system as recited in claim 3, wherein the multiple layers of net material are bonded together.

5. An electronic percussion instrument system as recited in claim 1, wherein the head comprises first and second layers of net material.

6. An electronic percussion instrument system as recited in claim 5, wherein the first and second layers of net material are bonded together.

7. A method of making an electronic percussion instrument system comprising:

providing a barrel section;

providing a head having a plurality of openings through which air may pass;

tensioning the head across an end of the barrel section to defme a percussion surface for receiving a percussion impact and a second surface facing opposite the percussion surface; and supporting a cushioning member and a transducer within the barrel section, with the cushioning member in contact with a portion of, but less than the entire surface area of the second surface of the head, wherein a portion of the second surface of the head is out of contact with the cushioning member to allow air to pass through the openings in the head upon an impact being received on the impact surface of the head.

8. An electronic percussion instrument system as recited in claim 7, wherein the head comprises a net-like material.

9. An electronic percussion instrument system as recited in claim 7, wherein the head comprises multiple layers of net-like material.

10. An electronic percussion instrument system as recited in claim 9, further comprising bonding the multiple layers of net-like material together.

11. An electronic percussion instrument system as recited in claim 7, wherein the head comprises first and second layers of net-like material.

12. An electronic percussion instrument system as recited in claim 11, further comprising bonding the first and second layers of net-like material together.

13. An electronic percussion instrument system comprising:

a barrel section having an open end;

a head composed of a flexible net-like material through which air may pass, the head being disposed in a tensioned state across the open end of the barrel section to define a percussion surface for receiving a percussion impact and a second surface facing opposite the percussion surface, the second surface defining a surface area spanning the opening on the first end of the barrel section;

a support member disposed within the barrel section; and a head sensor comprising a cushioning member and a transducer, the head sensor supported by the support member in contact with a portion of, but not the entire, second surface of the head to allow air to pass through the head.

14. An electronic percussion instrument system as recited in claim 13, wherein the transducer is supported between the support member and the cushioning member.

15. An electronic percussion instrument system as recited in claim 13, wherein the head comprises multiple layers of net material.

16. An electronic percussion instrument system as recited in claim 15, wherein the multiple layers of net material are bonded together.

17. An electronic percussion instrument system as recited in claim 15, wherein the head comprises first and second layers of net material.

18. An electronic percussion instrument system as recited in claim 17, wherein the first and second layers of net material are bonded together.

19. A head for a percussion instrument, the head comprising a frame and a net-like material comprising multiple net members, each net member supported by said frame, said net-like material having openings through which air may pass.

20. A head for a percussion instrument as recited in claim 19, wherein the multiple net members comprise first and second net members arranged generally flat against each other.

21. A head as recited in claim 19, wherein each net member comprising a plurality of longitudinally arranged fiber sections and a plurality of transversely arranged fiber sections interwoven with the longitudinally arranged fiber sections.

22. A head as recited in claim 19, wherein the multiple net members are bonded together.

23. A percussion instrument, comprising:

a generally hollow body having an opening into a body interior;

a generally flexible, net-like material tensioned state across the opening of the generally hollow body, the net-like material defining a percussion surface for receiving a percussion impact, the net-like material also having openings of a size sufficient to allow air to pass therethrough, upon receiving a percussion impact on the percussion surface; and a sensor supported by said generally hollow body, for providing an electronic signal in response to a percussion impact on the percussion surface of the generally flexible, net-like material.

24. A percussion instrument as recited in claim 23, wherein the net-like material comprises a plurality of net members arranged generally flat against each other.

25. A percussion instrument as recited in claim 24, wherein each of the net members comprises a plurality of longitudinally arranged fiber sections and a plurality of transversely arranged sections interwoven with the longitudinally arranged fiber sections.

26. A percussion instrument as recited in claim 19, wherein the multiple net members are bonded together.

27. A percussion instrument as recited in claim 24, wherein the plurality of net members comprises a pair of net members arranged adjacent each other, with the longitudinally directed fiber sections of one net member crossing the longitudinally directed fiber sections of the other net member in an oblique angle.

28. A method of making a percussion instrument having a generally hollow body with an opening, the method comprising disposing a net-like material in a tensioned state across the opening in the generally hollow body, wherein the net-like material has a percussion surface for receiving a percussion impact, the net-like material comprising a plurality of net members, each net member having a plurality of openings sufficient to allow air to pass therethrough upon the net-like material receiving a percussion impact on the percussion surface.

29. A method as recited in claim 28, further comprising the step of supporting an electronic sensor in communication with the percussion surface, for providing an electronic signal in response to a percussion impact on the percussion surface.

30. A method as recited in claim 28, wherein said net-like material comprises first and second net members, each net member comprising a plurality of longitudinally arranged fiber sections and a plurality of transversely arranged fiber sections interwoven with the longitudinally arranged fiber sections.

31. A method as recited in claim 28, wherein the first and second net members are bonded together.

32. An electronic percussion instrument system comprising:

a barrel section having a first end;

a head composed of a net-like material having multiple net members, said net-like material having openings through which air may pass, the net-like material disposed in a tensioned state across the first end of the barrel section to define a percussion surface for receiving a percussion impact and a second surface facing opposite the percussion surface;

a support member disposed within the barrel section; and a head sensor comprising a cushioning member and a transducer supported by the support member within the barrel section, with the cushioning member in contact with a portion of, but less than the entire surface area of the second surface of the net-like material and disposed in communication with the transducer, such that the transducer provides an electric signal in response to a percussion impact on the percussion surface.

33. An electronic percussion instrument system as recited in claim 32, wherein said multiple net members comprise no more than two net members.

* * * * *